US012681674B2

(12) United States Patent
Sugahara

(10) Patent No.: US 12,681,674 B2
(45) Date of Patent: Jul. 14, 2026

(54) IMAGE DISPLAY DEVICE, IMAGE DISPLAY METHOD, PROGRAM, AND STORAGE MEDIUM

(71) Applicant: FUJIFILM Corporation, Tokyo (JP)

(72) Inventor: Mayuko Sugahara, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 18/587,133

(22) Filed: Feb. 26, 2024

(65) Prior Publication Data

US 2024/0289079 A1 Aug. 29, 2024

(30) Foreign Application Priority Data

Feb. 28, 2023 (JP) ................................. 2023-030082

(51) Int. Cl.
G06F 3/14 (2006.01)
(52) U.S. Cl.
CPC .................................. G06F 3/1415 (2013.01)
(58) Field of Classification Search
CPC .. G06F 3/1415; G06F 3/0483; G06F 3/04842; G06F 3/04845
See application file for complete search history.

(56) References Cited

U.S. PATENT DOCUMENTS

2006/0268100 A1* 11/2006 Karukka ........... H04M 1/72469
348/14.01
2010/0054703 A1* 3/2010 Tanaka ............... H04N 21/4828
386/241

(Continued)

FOREIGN PATENT DOCUMENTS

WO 2018/021258 A1 2/2018

OTHER PUBLICATIONS

Octopus Effects, "Make slideshows with pictures that fall naturally in After Effects—71", Youtube, Oct. 14, 2018, XP09317406, URL: https://www.youtube.com/watch?v=U7LnwuAkpcs&t=0s.

(Continued)

*Primary Examiner* — Hong Zhou
(74) *Attorney, Agent, or Firm* — Studebaker Brackett PLLC

(57) ABSTRACT

Provided are an image display device, an image display method, a program, and a storage medium capable of detecting a placement position of a newly acquired image in a case of transition of a display screen.

An image display device according to an embodiment of the present invention includes: a processor. The processor is configured to execute: acquisition processing of acquiring a first image; first display processing of displaying a first screen; second display processing of displaying a second screen; and third display processing of displaying a third screen in which an image group including the first image is placed, the second display processing is executed between the first display processing and the third display processing, and the second display processing includes first presentment, in which a second image different from the first image in the image group is placed, on the second screen, second presentment, in which the first image is moved within the second screen while a display form of the first image is changed, after the first presentment, and third presentment, in which the first image is placed in a predetermined region, after the second presentment.

17 Claims, 16 Drawing Sheets

(56) References Cited

U.S. PATENT DOCUMENTS

| | | | |
|---|---|---|---|
| 2010/0058213 A1* | 3/2010 | Higuchi ............... | H04N 21/482 |
| | | | 715/766 |
| 2010/0083111 A1* | 4/2010 | de los Reyes ...... | G06F 3/04886 |
| | | | 715/702 |
| 2011/0126156 A1* | 5/2011 | Krishnaraj ............. | G06F 3/016 |
| | | | 345/629 |
| 2012/0162251 A1* | 6/2012 | Minamino ............. | G11B 27/34 |
| | | | 345/660 |
| 2013/0067392 A1 | 3/2013 | Leonard et al. | |
| 2013/0328888 A1* | 12/2013 | Beaver .................. | G06F 3/0482 |
| | | | 345/473 |
| 2014/0149903 A1 | 5/2014 | Ahn et al. | |
| 2017/0255841 A1* | 9/2017 | Yoo ....................... | G06F 3/0483 |
| 2019/0163354 A1 | 5/2019 | Ikuta et al. | |

OTHER PUBLICATIONS

Chris Hoffman, "How to Take Photos and Record Videos With Your Computer's Webcam", How-To-Geek, Nov. 29, 2015, XP093174231, pp. 1-10, URL: https://www.howtogeek.com/234786/how-to-take-photos-and-record-videos-with-your-computers-webcam/.
The extended European search report issued by the European Patent Office on Jul. 8, 2024, which corresponds to European Patent Application No. 24159893.7, and is related to U.S. Appl. No. 18/587,133.

\* cited by examiner

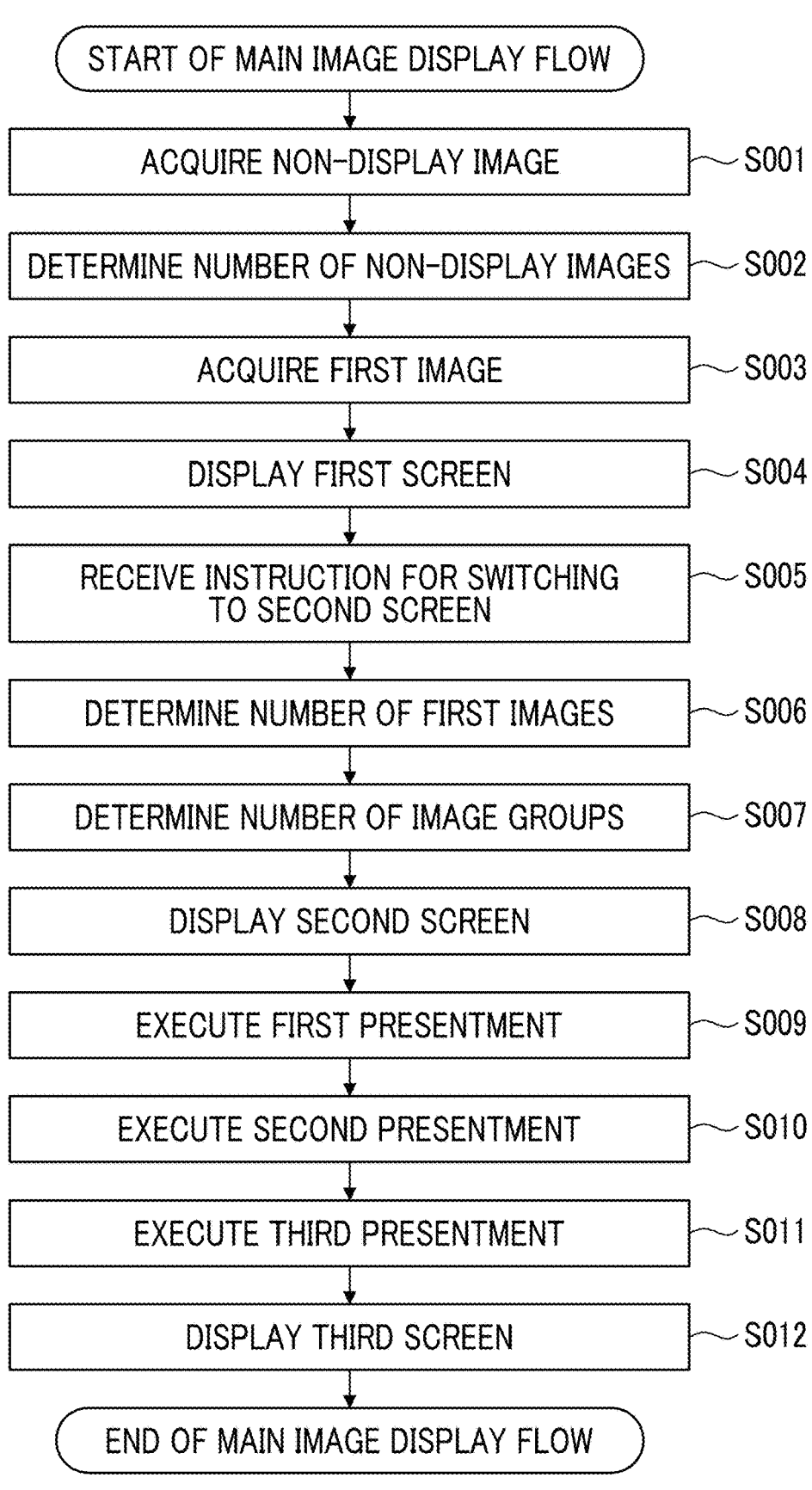

START OF MAIN IMAGE DISPLAY FLOW

ACQUIRE NON-DISPLAY IMAGE ～S001

DETERMINE NUMBER OF NON-DISPLAY IMAGES ～S002

ACQUIRE FIRST IMAGE ～S003

DISPLAY FIRST SCREEN ～S004

RECEIVE INSTRUCTION FOR SWITCHING TO SECOND SCREEN ～S005

DETERMINE NUMBER OF FIRST IMAGES ～S006

DETERMINE NUMBER OF IMAGE GROUPS ～S007

DISPLAY SECOND SCREEN ～S008

EXECUTE FIRST PRESENTMENT ～S009

EXECUTE SECOND PRESENTMENT ～S010

EXECUTE THIRD PRESENTMENT ～S011

DISPLAY THIRD SCREEN ～S012

END OF MAIN IMAGE DISPLAY FLOW

1

IMAGE DISPLAY DEVICE, IMAGE DISPLAY METHOD, PROGRAM, AND STORAGE MEDIUM

CROSS-REFERENCE TO RELATED APPLICATIONS

The present application claims priority under 35 U.S.C. § 119 to Japanese Patent Application No. 2023-030082, filed on Feb. 28, 2023. The above application is hereby expressly incorporated by reference, in its entirety, into the present application.

BACKGROUND OF THE INVENTION

1. Field of the Invention

An embodiment of the present invention relates to an image display device, an image display method, a program, and a storage medium.

2. Description of the Related Art

For example, WO2018-021258A discloses a content search device, an operation method and an operation program thereof, and a content search system capable of reducing a risk that a user misses a content of interest on a map on a search screen after enlargement display, in a case where a selection region selected by the user is displayed in an enlarged manner on the search screen including a map in which content is placed on the basis of attribute information.

SUMMARY OF THE INVENTION

In the above-mentioned image display device, the image of interest is an existing image which is preset on the image display device side, and the risk of the user missing such an image on the display screen after the transition is reduced. On the other hand, in the image display device, in a case where the image of interest is an image newly acquired by the image display device and is not displayed on the screen before the transition, such an image is displayed on the display screen after the transition. Therefore, the risk of the user missing the image cannot be reduced.

One embodiment of the present invention has been made in view of the above-mentioned circumstances, and an object thereof is to provide an image display device, an image display method, a program, and a storage medium capable of detecting a placement position of a newly acquired image in a case of transition of the display screen.

In order to achieve the above-mentioned object, according to an embodiment of the present invention, there is provided an image display device including: a processor. The processor is configured to execute: acquisition processing of acquiring a first image; first display processing of displaying a first screen; second display processing of displaying a second screen; and third display processing of displaying a third screen in which an image group including the first image is placed, the second display processing is executed between the first display processing and the third display processing, and the second display processing includes first presentment, in which a second image different from the first image in the image group is placed, on the second screen, second presentment, in which the first image is moved within the second screen while a display form of the first image is changed, after the first presentment, and third presentment, in which the first image is placed in a predetermined region, after the second presentment.

Further, the processor may be configured to display a third image, which is displayed on the first screen at an end of the first display processing, on the second screen.

Further, the processor may be configured to display the third image, which is displayed on the first screen, on the second screen in one or both of a display position and a display form of the third image.

The third image may be an image which is displayed at the end of the first display processing.

The third image may be an image which includes the first image.

Further, the processor may be configured to acquire a photographic image, which is obtained by capturing a photograph as the first image, in the acquisition processing.

Further, the processor may be configured to display the entire first image in the second screen during a period of the second presentment.

Further, the first image, which is used in the second display processing, may be a non-display image which has not been displayed on the third screen in the past.

Further, the processor may be configured to further execute first determination processing of determining the number of non-display images which have not been displayed on the third screen in the past. Further, the processor may be configured to set a first set value relating to the number of the non-display images. Further, the second display processing may be executed in a state where all the non-display images are set as the first images in a case where the number of the non-display images is less than the first set value. Further, the second display processing may be executed in a state where the non-display images having the same number as the first set value are set as the first images and remaining non-display images are set as the second images in a case where the number of the non-display images is equal to or greater than the first set value.

Further, the processor may be configured to perform display such that a display layer of the first image is positioned above a display layer of the second image in the third display processing.

Further, the processor may be configured to further execute second determination processing of determining the number of the first images in the second display processing. Further, the processor may be configured to set a second set value relating to the number of the first images. Further, the first images may be moved into a first region of the second screen in the second presentment in a case where the number of the first images is less than the second set value. Further, the first images may be moved into a second region larger than the first region of the second screen in the second presentment in a case where the number of the first images is equal to or greater than the second set value.

Further, the processor may be configured to: perform display such that a density of the image group is larger as the image group is closer to a center of the third screen in the third display processing.

Further, the processor may be configured to further execute third determination processing of determining the number of images in the image group displayed on the second screen in the third presentment. Further, the processor may be configured to set a third set value relating to the number of images. Further, a display size of each image of the image group in the third presentment may be displayed in a first size in a case where the number of images is less than the third set value. Further, a display size of each image of the image group in the third presentment may be displayed in a second size larger than the first size in a case where the number of images is equal to or greater than the third set value.

Further, the processor may be configured to change a placement position of at least one of the first image or the second image which are close to each other, in the third presentment.

Further, the processor may be configured to change a display shape of the first image during the movement of the first image, in the second presentment.

Further, in order to solve the above-mentioned problems, according to an embodiment of the present invention, there is provided an image display method causing a processor to execute: acquisition processing of acquiring a first image; first display processing of displaying a first screen; second display processing of displaying a second screen; and third display processing of displaying a third screen in which an image group including the first image is placed. The second display processing is executed between the first display processing and the third display processing, and the second display processing includes first presentment, in which a second image different from the first image in the image group is placed, on the second screen, second presentment, in which the first image is moved within the second screen while a display form of the first image is changed, after the first presentment, and third presentment, in which the first image is placed in a predetermined region, after the second presentment.

Further, according to the embodiment of the present invention, it is possible to realize a program causing a computer to execute each processing included in the above-mentioned image display method.

Further, according to the embodiment of the present invention, it is possible to realize a computer-readable storage medium storing: a program that causes a computer to execute each processing included in the above-mentioned image display method.

According to the embodiment of the present invention, it is possible to provide an image display device, an image display method, a program, and a storage medium capable of detecting a placement position of a newly acquired image in a case of transition of a display screen.

BRIEF DESCRIPTION OF THE DRAWINGS

FIG. 2 is a second diagram showing a brief overview of an example of transition of the image display screen according to the embodiment of the present invention.

FIG. 11 is a diagram showing a procedure of a main image display flow.

DESCRIPTION OF THE PREFERRED EMBODIMENTS

A specific embodiment of the present invention will be described, with reference to the drawings. However, the embodiment described below is merely an example for ease of understanding of the present invention, and is not intended to limit the present invention. Moreover, the present invention can be changed or improved from the embodiment described below without departing from the gist of the present invention. Moreover, the present invention includes its equivalents.

In the present specification, the concept of "apparatus" includes a single apparatus that exerts a specific function in one apparatus, and includes a combination of a plurality of apparatuses that are distributed and present independently of each other and exert a specific function in cooperation (coordination) with each other.

In the present specification, an "image" is defined as image data unless otherwise specified. Examples of the image data include lossy compressed image data, such as joint photographic experts group (JPEG) format, and lossless compressed image data, such as graphics interchange format (GIF) or portable network graphics (PNG) format. Further, the image data may include accessory information representing a file name, an imaging date and time, an imaging location, and the like.

Further, in the present specification, the "user" is a user who uses the image display device according to the embodiment of the present invention. The meaning of using the image display device is to use a function of the image display device, and includes to directly operate the image display device, and to use the function of the image display device via a device (for example, a user terminal) that can communicate with the image display device.

Regarding Brief Overview of One Embodiment of Present Invention

Image display (hereinafter, main image display), which is performed using the image display device and the image display method according to the embodiment of the present invention, will be described with reference to FIGS. 1 to 3.

In the main image display, images, which have been acquired by the user in the past, are simultaneously displayed on the screen as an image group, and presentment in which the images that the user takes an interest among the images are remarkably displayed, specifically, an animation display is performed.

As a specific presentment example in the main image display, the following three presentment examples will be described. It should be noted that which presentment example is executed in the main image display may be freely selected by the user, or may be automatically determined in accordance with a certain rule.

Regarding First Presentment Example

A first presentment example of the main image display will be described with reference to FIG. 1.

Figure 1:
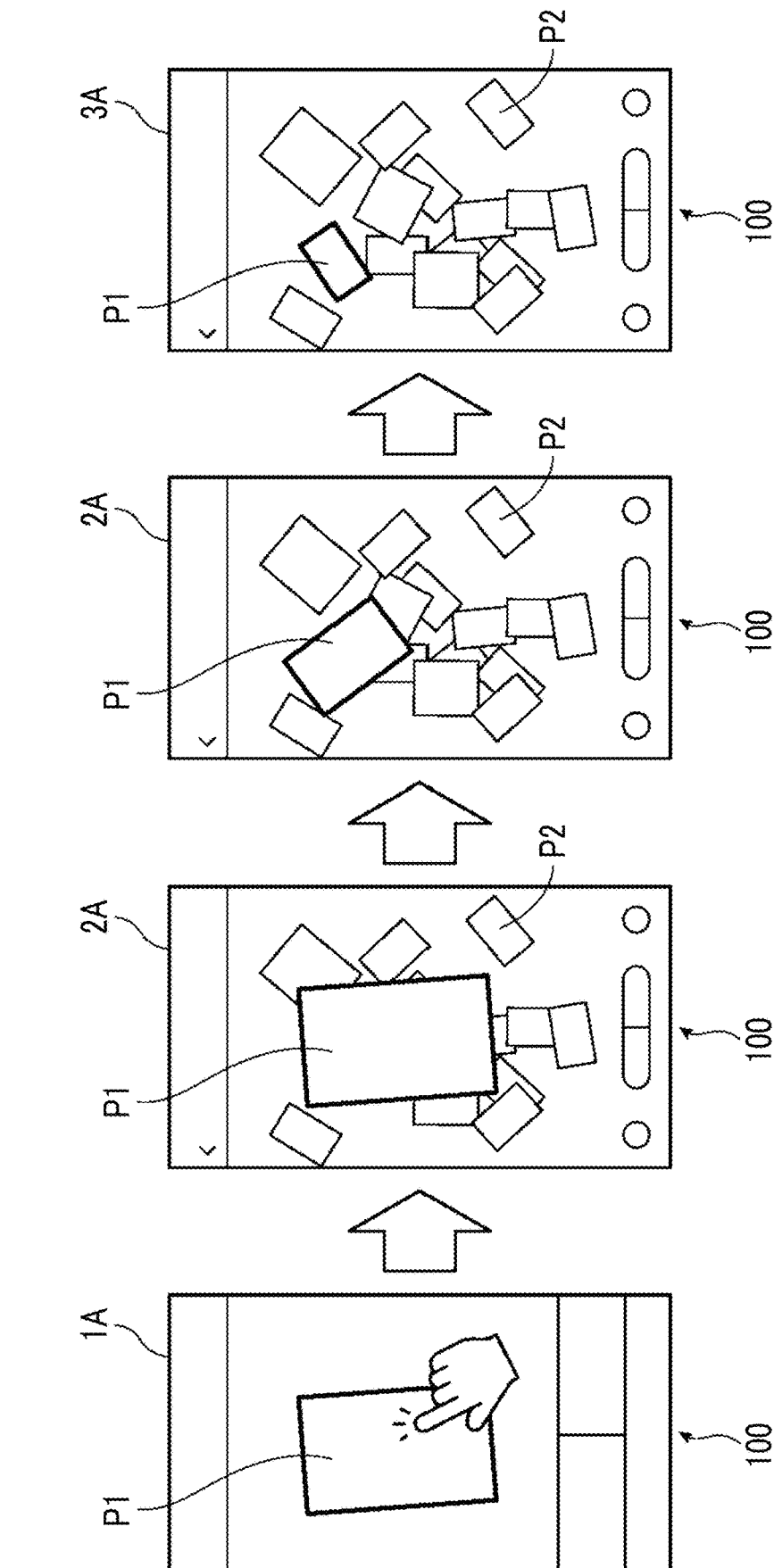
FIG. 1 is a first diagram showing a brief overview of an example of transition of an image display screen according to an embodiment of the present invention.

FIG. 1 shows a transition of a screen displayed on a user terminal 100. Specifically, the screen transitions in order from a first screen 1A (which is first from the left in FIG. 1), a second screen 2A (which is second from the left in FIG. 1), and a third screen 3A (which is fourth from the left in FIG. 1).

The user terminal 100, which performs the main image display, is a computer used by the user, and specifically, includes a smart device such as a smartphone, a tablet terminal, a laptop personal computer (PC), or the like.

The image, which is displayed on the screen in the main image display, is, for example, a photographic image which is obtained by capturing a photograph printed by a printer. The photograph is a medium such as an instant film in which an image of a subject is developed on a medium. The photographic image may include a front face image and a rear face image. The front face image is, for example, an image on the face side on which the image of the subject in the photograph is developed. The rear face image is, for example, an image on a side opposite to the front face, that is, on a face side on which the image of the subject is not formed.

It should be noted that the image, which is displayed on the screen in the main image display, is not limited to the above-mentioned photographic image, and may be, for example, a general captured image which is obtained by imaging a subject or a landscape in a real space. Alternatively, an image which shows a part of the virtual space created by computer graphics (CG) technique or the like, an image which can be acquired by another acquisition method, or the like may be used in the main image display.

In using the main image display, the user first activates an image display application program (hereinafter, an image display application) which is installed on the user terminal 100 in advance. In a case where the user is authenticated, the screen of the user terminal 100 switches to the first screen 1A. The first screen 1A is, for example, a screen after the activation of the image display application, that is, a top screen. As shown in FIG. 1, a first image P1 is placed on the first screen 1A.

For example, the first image P1 is selected from an image group which is saved in the user terminal 100. Each image, which constitutes the image group, is an image that has been acquired by the user in the past and saved in the user terminal 100, and is, for example, an image that has been captured by the user in the past or an image that is downloaded by the user from an external website through the Internet or the like.

The first image P1 is selected from, for example, images (that is, non-display images to be described later) which are not used in the main image display having performed in the past, that is, images which have not been displayed in the main image display in the past. In the present example, the first image P1 is a non-display image which is lastly saved in the user terminal 100, in other words, a non-display image which has the latest save date and time in the image group.

It should be noted that the first image P1 is not limited to the non-display image saved in the user terminal 100. For example, an image, which is selected from an image group saved in association with the user information in the database server 11 (refer to FIG. 4) included in the image display system S to be described later, may be used as the first image P1.

In a case where the user selects the first image P1 on the screen on the first screen 1A, the screen of the user terminal 100 transitions from the first screen 1A and is switched to the second screen 2A (which is second from the left in FIG. 1). The presentment using animation is executed in the screen transition. More specifically, the first image P1, which is the same as the first image P1 displayed on the first screen 1A, preferably the first image P1, which has the same display position and display size as the first image P1 displayed on the first screen 1A, is displayed on the second screen 2A. The plurality of second images P2, each of which has a display size sufficiently smaller than the display size of the first image P1, are randomly placed and displayed in a region other than the first image P1 on the second screen 2A.

The term "randomly" indicates a state where the respective images constituting an image group are irregularly placed.

The "second image P2" is an image other than the first image P1 in the image group. Specifically, the second image P2 corresponds to, among images saved in the user terminal 100 or the database server 11, an image which is used in the main image display having performed in the past, an image other than the first image P1 in the non-display images, and the like.

On the second screen 2A (which is third from the left in FIG. 1) on which the presentment is further progressed, the first image P1 moves toward the placement region, in which the plurality of second images P2 are placed, while reducing the display size of the first image P1. Finally, the first image P1 is randomly placed in the placement region together with the plurality of second images P2. At this time, the first image P1 is positioned on the display layer above the second image P2. The display layer is a layer for image display defined in a direction perpendicular to the screen. The user recognizes the display layer such that the display layer is placed closer to the front side in the normal direction of the screen as displayed as an image on a higher layer.

It should be noted that the term "placement region" means the entire region of the screen for each of the first to third screens, and is defined in the same manner in the following description.

As described above, on the second screen 2A, the presentment of the animation is performed such that the first image P1 is dropped in the depth direction (direction perpendicular to the second screen 2A) of the second screen 2A in the real space. Such presentment is executed using a well-known image processing technique of changing an outer shape of the first image P1, specifically, an image processing technique for animation display. In the present example, the outer shape of the first image P1 is set to be rectangular, and the outer shape size of the first image P1 is gradually reduced while the outer shape of the first image P1 is kept rectangular.

Thereafter, in a case where the presentment using the second screen 2A ends, the screen of the user terminal 100 transitions to a third screen 3A (which is fourth from the left in FIG. 1) on which the image group including the first image P1 is randomly placed. It should be noted that in the example shown in FIG. 1, the display position and the display size of the image group are the same on a screen, which is at the end time point of the presentment on the second screen 2A, and the third screen 3A. That is, as viewed from a user, the screen, which is at the end time point of the presentment of the second screen 2A, and the third screen 3A are substantially the same screen, and the continuity (identity) of both screens is ensured.

Regarding Second Presentment Example

A second presentment example of the main image display will be described with reference to FIG. 2.

Figure 2:
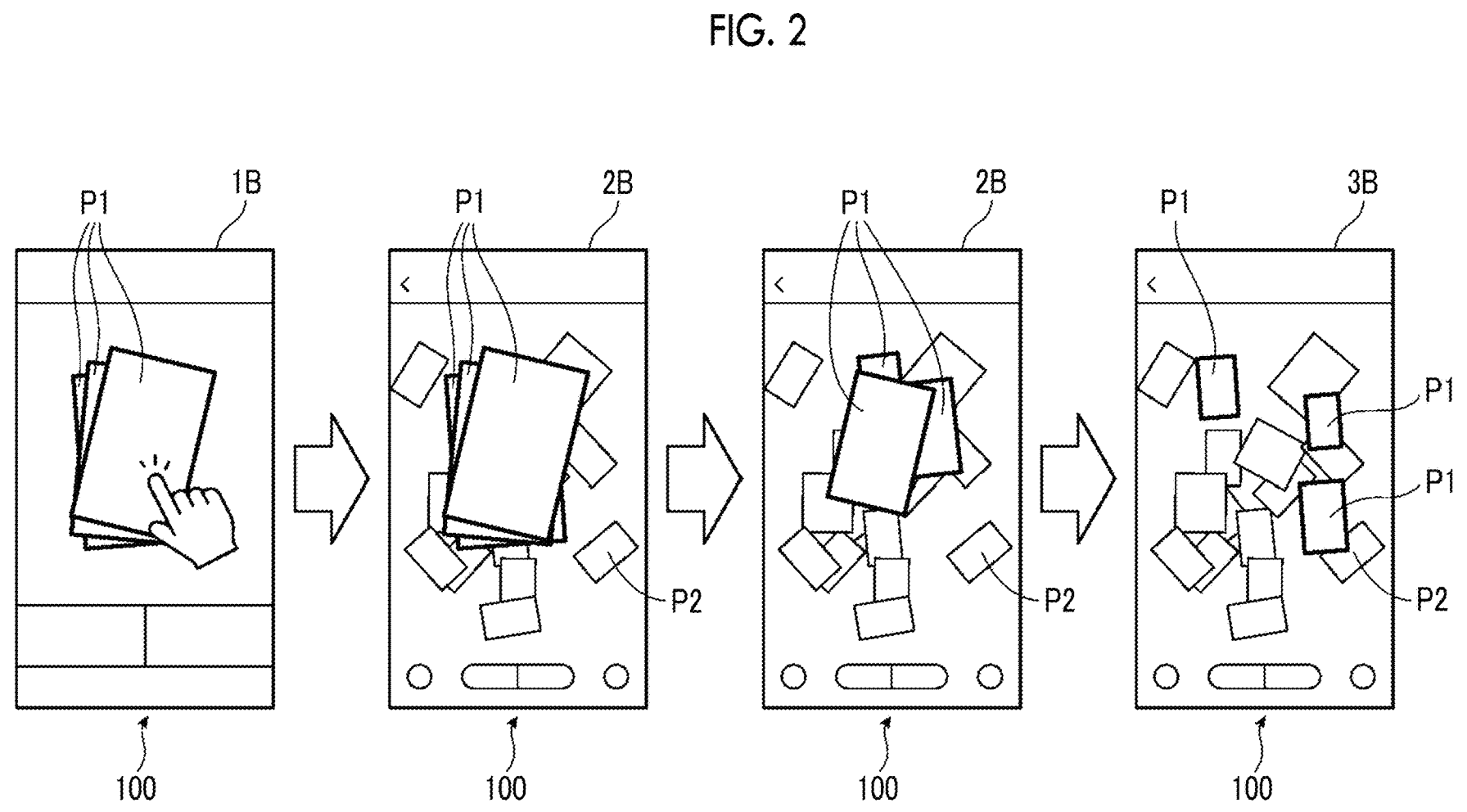

The second presentment example is different from the first presentment example described above in that the plurality of the first images P1 are placed on the first screen 1B (which is first from the left in FIG. 2). Each of the plurality of first images P1 is placed on each display layer.

In the second presentment example, the first image P1 is selected from the non-display images as in the first presentment example. At this time, it is assumed that, as the first image P1, a plurality of latest images including a last saved image among the non-display images are acquired. Regarding the plurality of first images P1, as the first image P1 has a newer save date and time, the first image P1 is placed on a higher display layer.

In a case where the plurality of first images P1 placed on the screen are selected by the user on the first screen 1B, the screen of the user terminal 100 transitions from the first screen 1B, and is switched to the second screen 2B (which is second from the left in FIG. 2). More specifically, the plurality of first images P1, which are the same as the plurality of first images P1 displayed on the first screen 1B, are displayed on the second screen 2B. Specifically, the plurality of first images P1, which have the same display positions and display sizes as the plurality of first images P1 displayed on the first screen 1B, are displayed on the second screen 2B. The plurality of second images P2, which have sufficiently smaller display sizes than the plurality of first images P1, are randomly placed in a region other than the plurality of first images P1 on the second screen 2B.

On the second screen 2B (which is third from the left in FIG. 2) in a stage in which the presentment is further progressed, each of the plurality of first images P1 moves toward the placement region of the second images P2 while reducing the display size of each of the plurality of first images P1. Finally, each first image P1 is placed in the placement region together with the second image P2. In addition, at a start time point of the presentment using the second screen 2B, the first image P1 reaches the placement region earlier as the first image P1 is positioned on the lower display layer, and reaches the placement region later as the first image P1 is positioned on the higher display layer. That is, the first image P1, which is positioned on the highest display layer, reaches the placement region last.

As described above, on the second screen 2B, the presentment of the animation is performed such that the plurality of the first images P1 are dropped in the depth direction (direction perpendicular to the second screen 2B) of the second screen 2B in the real space.

Thereafter, in a case where the presentment using the second screen 2B ends, the screen of the user terminal 100 transitions from the second screen 2B, and is switched to a third screen 3B (which is fourth from the left in FIG. 2) on which the image group including the plurality of first images P1 is randomly placed. It should be noted that in the second presentment example, the display position and the display size of the image group are the same on the screen, which is at the end time point in the second screen 2B, and the third screen 3B. That is, as viewed from a user, the second screen 2B at the end time point of the presentment and the third screen 3B are substantially the same screen, and the continuity (identity) of both screens is ensured.

Regarding Third Presentment Example

A third presentment example of the main image display will be described with reference to FIG. 3.

In the third presentment example, a method of acquiring the first image P1 is different from the above-mentioned presentment examples. That is, in the presentment example, the first image P1 is acquired from among the non-display images in the image group which is saved in the user terminal 100 or the database server 11. In contrast, in the third presentment example, for example, an image, which is captured by using a camera mounted on the user terminal 100, is acquired as the non-display image. Then, the first image P1 is acquired from among the non-display images.

More specifically, a live view image is displayed on a first screen 1C (which is first from the left in FIG. 3) while the camera of the user terminal 100 captures an image. Then, in a case where the user selects an imaging icon Y displayed on the lower side of the first screen 1C during a display period of the live view image, an image of a subject, which is shown up in the live view image at that time point, is captured, and the captured image can be acquired as the non-display image. The non-display image subsequent to imaging is temporarily displayed on the first screen 1C, but the non-display image is not displayed after a lapse of a certain period of time. Thereafter, the live view image is displayed again on the first screen 1C, and the user terminal 100 is in a state where a new non-display image can be captured.

Thereafter, in a case where the user selects an icon Z displayed on the lower side of the first screen 1C, the screen of the user terminal 100 transitions from the first screen 1C, and is switched to the second screen 2C (which is second from the left in FIG. 2). That is, the acquired non-display image is displayed as the first image P1, and the same presentment as the second screen 2A in the first presentment example is performed. Finally, the screen is switched to a third screen which is not illustrated and on which an image group including the first image P1 is randomly placed.

In addition, in the third presentment example, a plurality of non-display images can be acquired by selecting the imaging icon Y displayed on the first screen 1C a plurality of times and repeatedly executing imaging. In a case where the user selects the icon Z, the screen of the user terminal 100 switches to a second screen, and the acquired plurality of non-display images are displayed as the plurality of first images P1. Regarding the plurality of first images P1, as in the second screen 2B in the second presentment example, as the first image P1 has a newer save date and time, the first image P1 is placed on a higher display layer.

Thereafter, the same presentment as the second presentment example is performed, and finally, the screen of the user terminal 100 transitions from the second screen 2C, and is switched to a third screen which is not illustrated and on which the image group including the first image P1 is randomly placed.

Regarding Configuration Example of Image
Display System According to One Embodiment of
Present Invention A configuration of an image display system (hereinafter, also referred to as an "image display system S"), which includes the image display device according to the embodiment of the present invention, will be described with reference to FIG. 4.

Figure 4:
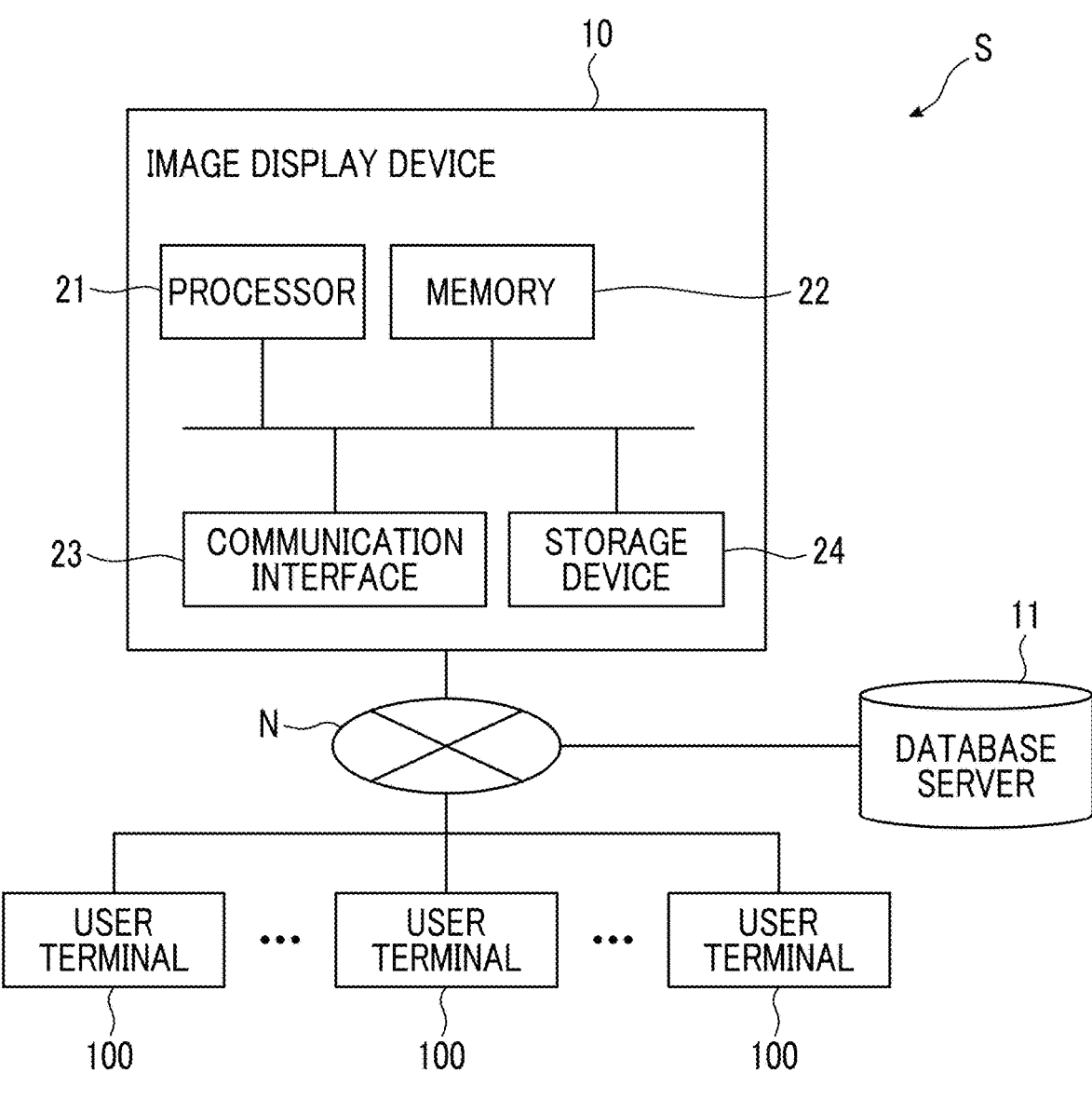
FIG. 4 is a diagram showing a configuration example of an image display system including an image display device according to an embodiment of the present invention.

As shown in FIG. 4, the image display system S is configured by using an image display device 10, the plurality of user terminals 100, and the database server 11.

The image display device 10 is configured by using a computer, and is configured by using, for example, a personal computer (PC), a workstation, a server computer, or the like. The image display device 10 may be configured by using one computer, or may be configured by using a plurality of computers distributed in parallel. Further, in a case where the computer constituting the image display device 10 is a server computer, a server computer for an application service provider (ASP), a software as a service (SaaS), a platform as a service (PaaS), or an infrastructure as a service (IaaS) may be used. In such a case, in a case where necessary information is input to the user terminal 100, the above-mentioned server computer executes various kinds of processing (calculation) on the basis of the input information, and the calculation result is output on the user terminal 100 side. Consequently, a function of the server computer, which is the image display device 10, can be used on the user terminal side.

As shown in FIG. 4, the computer constituting the image display device 10 includes a processor 21, a memory 22, a communication interface 23, and a storage device 24.

The processor 21 is configured by using, for example, a central processing unit (CPU), a micro-processing unit (MPU), a micro controller unit (MCU), a graphics processing unit (GPU), a digital signal processor (DSP), a tensor processing unit (TPU), an application specific integrated circuit (ASIC), or the like.

The memory 22 is configured by using, for example, a semiconductor memory, such as a read only memory (ROM) and a random access memory (RAM).

The communication interface 23 may be configured by using, for example, a network interface card or a communication interface board. The computer constituting the image display device 10 is able to communicate with another device connected to the Internet, a mobile communication line, or the like via the communication interface 23.

The storage device 24 is configured by using, for example, a flash memory, a hard disc drive (HDD), a solid state drive (SSD), a flexible disc (FD), a magneto-optical disc (MO disc), a compact disc (CD), a digital versatile disc (DVD), a secure digital card (SD card), a universal serial bus memory (USB memory), or the like. It should be noted that the storage device 24 may be built in a computer body constituting the image display device 10 or may be mounted on the computer body in an external format.

The user terminal 100 includes a smart device such as a smartphone, a tablet terminal, or a laptop personal computer (PC). The user terminal 100 includes a processor, a memory, and a communication interface. As described above, the user terminal 100 stores an image display application for using the image display system S. The user downloads the image display application from a predetermined site and installs the image display application on the user terminal 100 in a case of using the image display system S.

The database server 11 is, for example, a cloud-type server that is provided by a company which operates a service using the image display device 10, specifically, a company which provides a service of the main image display. The database server 11 stores the image group which is saved in association with the user information. The user who uses the main image display is able to browse each image of the image group which is stored in the database server 11 through the image display application.

It should be noted that the database server 11 may be configured as a part of the image display device 10.

Figure 5:
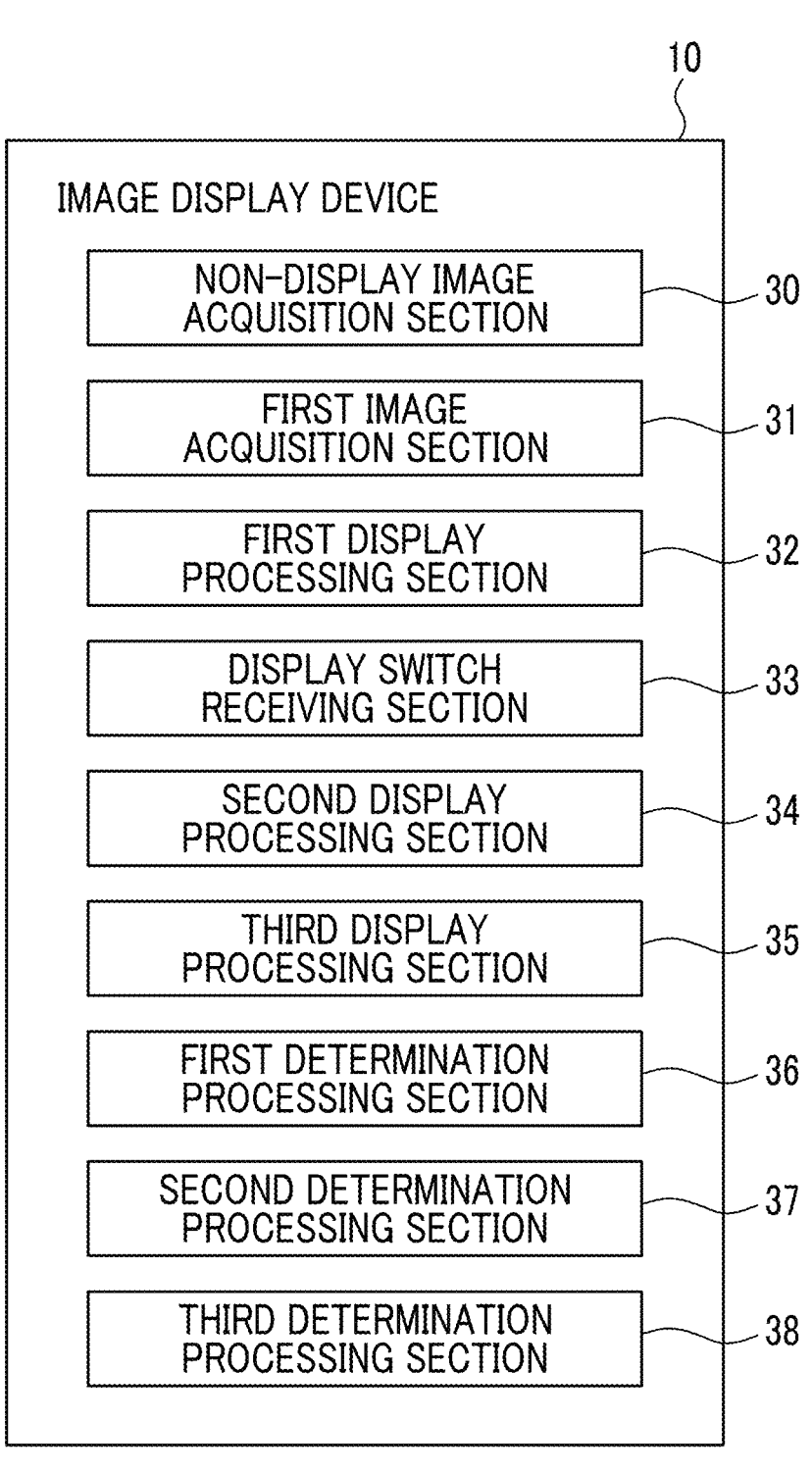
FIG. 5 is an explanatory diagram of a function of the image display device according to the embodiment of the present invention.

Regarding Functions of Image Display Device
According to One Embodiment of Present
Invention Next, a configuration of the image display device 10 according to an embodiment of the present invention will be described again from a functional aspect. As shown in FIG. 5, the image display device 10 has a non-display image acquisition section 30, a first image acquisition section 31, a first display processing section 32, a display switch receiving section 33, a second display processing section 34, a third display processing section 35, a first determination processing section 36, a second determination processing section 37, and a third determination processing section 38.

These functional sections are implemented by the cooperation between the hardware device included in the computer constituting the image display device 10 and the program (that is, software) installed in the computer.

Hereinafter, each functional section will be described.

Non-Display Image Acquisition Section

The non-display image acquisition section 30 acquires a non-display image from an image group which is saved in the user terminal 100 or the database server 11.

As described above, the "non-display image" is an image that has not been used in the past for performing the main image display, and more specifically, means an image which has not been displayed on the third screen in the past. The non-display image acquisition section 30 extracts information as to whether or not an image is a non-display image and a save date and time, from the accessory information of each image included in the image group, and acquires the non-display image in association with the save date and time.

Further, the non-display image acquisition section 30 may acquire the non-display image through a method other than the above-mentioned method, specifically, by newly capturing an image using the camera of the user terminal 100 as in the third presentment example described above.

First Image Acquisition Section

The first image acquisition section 31 executes acquisition processing of acquiring the first image P1. More specifically, the first determination processing section 36, which will be described later, performs determination as to the first image P1 on the non-display image acquired by the non-display image acquisition section 30. The first image acquisition section 31 acquires the first image P1 on the basis of the determination result.

In a case of acquiring one first image P1, the first image acquisition section 31 acquires a last saved image among the non-display images. Further, in a case of acquiring the plurality of first images P1, the first image acquisition section 31 acquires non-display images, which have the number equal to or less than a first set value to be described later, among the latest non-display images including the last saved non-display image.

In a case where the non-display image acquisition section 30 acquires a non-display image by capturing a photograph, the first image acquisition section 31 acquires a photographic image that is the non-display image as the first image P1.

First Display Processing Section

The first display processing section 32 executes first display processing of displaying the first screen after the acquisition processing of the first image P1.

The first screen may be a screen, on which one or a plurality of first images P1 are placed, such as the first screens 1A and 1B shown in FIGS. 1 and 2. Alternatively, as in the first screen 1C shown in FIG. 3, on the first screen, the first image P1 is temporarily displayed at a time point subsequent to imaging. However, the first screen may be a screen on which the first image P1 is not displayed after a lapse of a predetermined time from the time point of imaging.

In addition, in the first or second presentment example, the first display processing section 32 displays the first image P1 (corresponding to a third image) on the first screens 1A and 1B at the end of the first display processing. Consequently, the third image is an image displayed at the end of the first display processing, and is an image including the first image P1.

Display Switch Receiving Section

The display switch receiving section 33 receives an instruction to switch the display from the first screen to the second screen.

More specifically, in the examples shown in FIGS. 1 and 2, the display switch receiving section 33 receives an instruction to switch the display by the user selecting the first image P1 placed on the first screens 1A and 1B. In the example shown in FIG. 3, the display switch receiving section 33 receives the above-mentioned instruction by the user selecting the icon Z positioned on the lower left side of the first screen 1C.

Second Display Processing Section

The second display processing section 34 executes second display processing of switching the first screen after the first display processing to display the second screen for presentment. In other words, the second display processing section 34 is executed between the first display processing and the third display processing.

Specifically, the second display processing section 34 performs each of the first presentment, the second presentment, and the third presentment. Hereinafter, each presentment will be described.

First Presentment

The second display processing section 34 executes the first presentment in which the second image P2 different from the first image P1 in the image group is placed in the placement region on the second screen. More specifically, the second display processing section 34 randomly places the second image P2 in the placement region.

As described above, the second image P2 corresponds to, among images saved in the user terminal 100 or the database server 11, an image which is used in the main image display having performed in the past, and an image other than the first image P1 in the non-display images.

Further, in the first presentment, the second display processing section 34 places a display layer of the first image P1 above the display layer of the second image P2. A display size of the first image P1 is sufficiently larger than a display size of the second image P2. That is, as the first presentment, the second display processing section 34 performs presentment as if the first image P1 is positioned above the second image P2 randomly placed, in the real space. In other words, in the first presentment, the first image P1 is placed at a start position of the animation in which the first image P1 is dropped in the depth direction of the second screen.

In addition, in a case where there are the plurality of first images P1, as in a second screen 2B (which is second from the left in FIG. 2) shown in FIG. 2, the second display processing section 34 places each of the plurality of first images P1 on each display layer and places the first image P1 on a higher display layer as the first image P1 has a newer save date and time.

The first image P1 used in the first presentment may be displayed at any position in the placement region of the second screen. In addition, as long as the condition of being larger than the display size of the second image P2 is satisfied, the first image P1 may be displayed in any display size.

Figure 3:
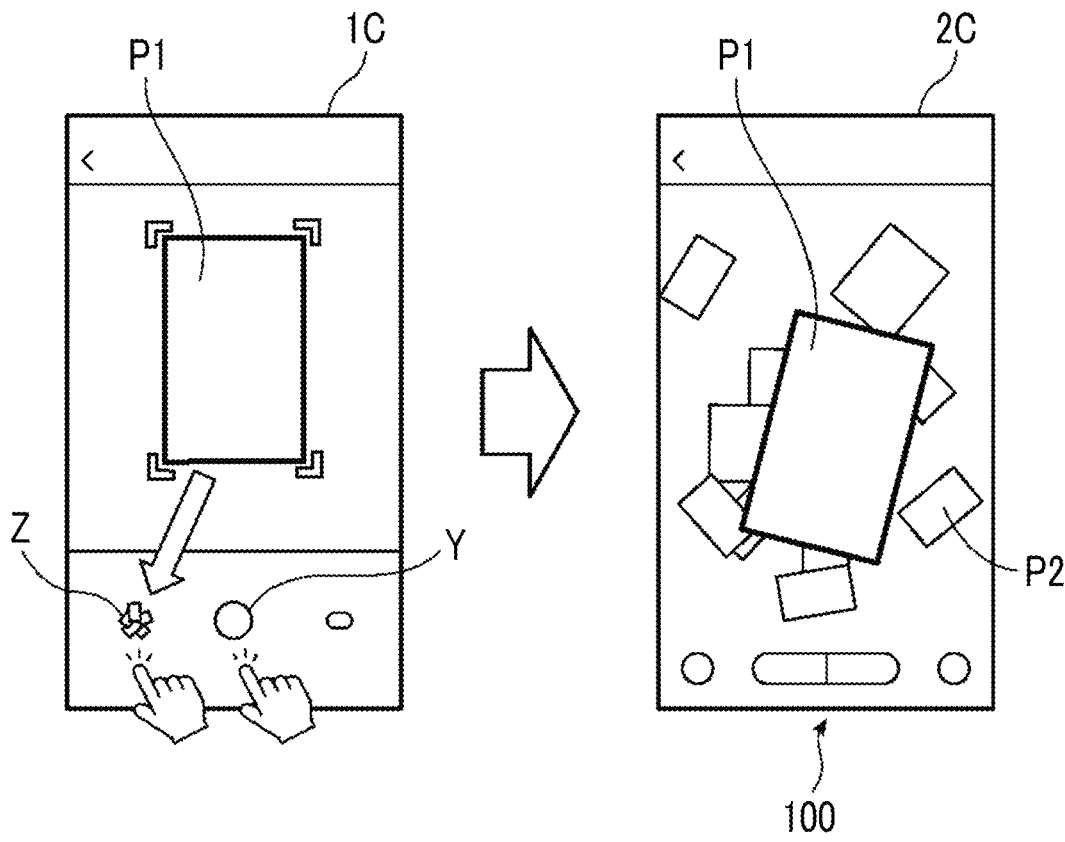
FIG. 3 is a third diagram showing a brief overview of an example of transition of the image display screen according to the embodiment of the present invention.

For example, as in the example shown in FIG. 3, the display positions and the display sizes of the first images P1 in a case where the transition is performed from the first screen to the second screen may be different. In such a case, the display position and the display size of the first image P1 used in the first presentment may be appropriately changed, for example, in a case where the main image display is performed.

On the other hand, as in the examples shown in FIGS. 1 and 2, in a case of the transition from the first screen to the second screen, the display position and the display size of the first image P1 (corresponding to the third image) used for the second presentment may be the same as those of the first image P1 (corresponding to the third image) on the first screen.

Second Presentment

After the first presentment, the second display processing section 34 performs the second presentment in which the first image is moved within the second screen while changing a display form of the first image P1. The "while changing the display form" means, as will be described later, change in a display size of the first image P1, change in an angle of rotation of the first image P1, switching between an image of the front and an image of the rear of the first image P1, or the like. For example, the second display processing section 34 performs the second presentment in which the first image P1 is moved into the placement region on the second screen while reducing the display size of the first image P1 after the first presentment. As described above, the second display processing section 34 executes the second presentment using the well-known image processing technique of changing the outer shape of the first image P1, specifically, the image processing technique for animation display.

More specifically, as in the example shown in FIG. 1, first, the second display processing section 34 displays the first image P1 such that the outer shape of the first image P1 is a rectangular shape with a predetermined outer shape size, as shown in the second screen 2A (which is second from the left in FIG. 1), at the start time point of the second presentment. Next, as shown in the second screen 2A (which is third from the left in FIG. 1), the second display processing section 34 gradually reduces the outer shape size of the first image P1 in a state where the outer shape thereof is kept rectangular in a period from the start to the end of the second presentment (during the period of the second presentment).

Here, during the period of the second presentment, the second display processing section 34 may reduce the outer shape size of the first image P1 while changing an angle of rotation of the first image P1 with respect to a rotation axis in a case where the depth direction of the second screen 2A is set as the rotation axis. In other words, as shown in FIG. 1, the angles of the first image P1 (which is second from the left in FIG. 1) at the start time point of the second presentment and first image P1 (which is third from the left in FIG. 1) in progress of the second presentment with respect to the rotation axes are different from each other.

It should be noted that the second display processing section 34 may reduce the outer shape size of the first image P1 while keeping a constant angle of rotation of the first image P1 with respect to the rotation axis in the period from the start to the end of the second presentment.

Further, the second display processing section 34 may reduce the outer shape size of the first image P1 while moving the first image P1 within the second screen, during the period of the second presentment.

A direction, in which the first image P1 is moved, may be any direction in the second screen. Here, the second screen at the end time point of the second presentment is a screen which is the same as the third screen (which is third from the left in FIG. 1) at the start time point of the third presentment to be described below. Accordingly, during the period of the second presentment, the second display processing section 34 moves the first image P1 toward the placement position of the first image P1 at the start time point of the third presentment.

It should be noted that, during the period of the second presentment, the second display processing section 34 may reduce the outer shape size of the first image P1 while fixing the first image P1 at the position of the first image P1 at the start time point of the second presentment.

Further, the second display processing section 34 may reduce the outer shape size of the first image P1 while displaying the image of the front of the first image P1 during the period of the second presentment. As described above, in a case of a photographic image, the image of the front is, for example, an image on a side where a subject image of the photograph is developed.

It should be noted that in the above description, the second display processing section 34 keeps the outer shape of the first image P1 rectangular during the period of the second presentment, but the present invention is not limited thereto. For example, the outer shape size may be reduced while the outer shape of the first image P1 is changed from a rectangular shape to another shape such as a parallelogram.

In such a case, as the second presentment, the presentment is executed such that the first image P1 drops relatively slowly while reciprocating along the vertical direction or the horizontal direction of the second screen.

Further, in the above description, the second display processing section 34 continues to display an image of the front as the first image P1 during the period of the second presentment, but the present invention is not limited thereto.

For example, during the period of the second presentment, the outer shape size of the first image P1 may be reduced while the first image P1 is switched between the image of the front and the image of the rear.

Further, as shown in FIG. 2, the second display processing section 34 may move the plurality of first images P1 into the placement region of the second screen. In such a case, as described above, the second display processing section 34 performs display such that the first image P1 reaches the placement region earlier as the first image P1 is positioned on a lower display layer and reaches the placement region as the first image P1 is positioned on a higher display layer. Consequently, in the second presentment, the presentment is executed such that the first image P1 positioned on the highest display layer reaches the placement region last.

Further, for example, the second display processing section 34 may change a speed in a case where the first image P1 is moved, that is, a speed at which the display size of the first image P1 is reduced, during the period of the second presentment.

Further, the second display processing section 34 may display the entire first image P1 in the second screen, for example, during the period of the second presentment. Consequently, the second display processing section 34 changes the outer shape of the first image P1 such that the first image P1 enters the second screen during the period of the second presentment.

Third Presentment

After the second presentment, the second display processing section 34 performs the third presentment in which the first image P1 is placed in the placement region (corresponding to the predetermined region). More specifically, the second display processing section 34 places the first image P1 in the placement region with the display size which is substantially the same as the display size of the second image P2 placed in the placement region.

Further, in the third presentment, the second display processing section 34 performs display such that the display layer of the first image P1 is positioned above the display layer of the second image P2. As the display layer of the first image P1 is positioned higher at the start time point of the second presentment, the display layer of each of the plurality of first images P1 is positioned higher in the third presentment.

Further, the second display processing section 34 may change a placement position of at least one of the first image P1 or the second image P2 close to each other in the third presentment. Consequently, the presentment is performed as if the dropped first image P1 comes into contact with the second image P2 in the real space and at least one placement position is moved in the direction along the placement region.

Further, the second display processing section 34 may acquire information about the subject displayed in the image from the accessory information of each image constituting the image group, and may move the first image P1, which is similar to the second image P2, to the region, in which the second image P2 is placed, on the basis of the subject information.

Third Display Processing Section

After the second display processing, the third display processing section 35 executes third display processing of displaying the third screen on which the image group including the first image P1 and the second image P2 is randomly placed. The outer shape of the first image P1 displayed on the third screen is formed to be similar to the outer shape of the first image P1 at the start time point of the second presentation. Specifically, the outer shape is formed as a rectangular shape having a smaller outer shape than the first image P1 at the start time point of the second presentment.

In the third display processing, the third display processing section 35 performs display such that the display layer of the first image P1 is positioned above the display layer of the second image P2.

Further, as shown in FIG. 2, in a case where the plurality of first images P1 are placed in the placement region, as the display layer of the first image P1 is positioned higher at the start time point of the second presentment, the first image P1 is displayed higher also in the placement region.

Figures 6, 7:
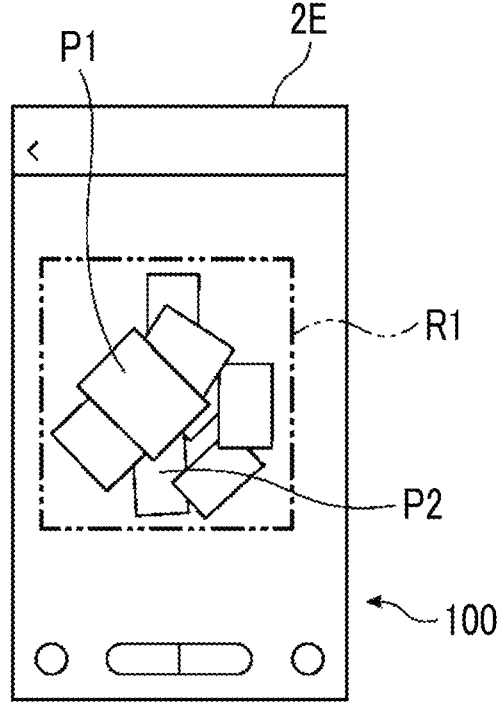
FIG. 6 is a diagram showing an example of a third screen.
FIG. 7 is a diagram showing an example of a second screen.

Further, as shown in FIG. 6, the third display processing section 35 displays the image group such that the density of the image group is higher as the image group is closer to the center C of the third screen 3D. The term "density of the image group" indicates a distance between images constituting the image group. The higher the density of the image group, the closer the distance between the images is.

Further, the first image P1 displayed on the third screen displays a face on the same side as the first image P1 at the start time point of the second presentment, that is, an image of the front. Consequently, in the above description, the outer shape size of the first image P1 may be reduced while the first image P1 is switched between the image of the front and the image of the rear during the period of the second presentment. However, it is assumed that the first image P1 displayed on the third screen displays the same front face as the first image P1 at the start time point of the second presentment.

Further, the placement position of the image group on the third screen may be saved in the database server 11 and reproduced in the next main image display. Alternatively, in the next main image display, the image group may be re-placed so as to be different from the placement position of the image group on the current third screen. Specifically, a function of automatically re-placing the image group in a case of activating the image display application or a re-placement function (shuffle function) that can be operated by the user may be provided. Further, the third display processing section 35 may have a function of causing the user to operate the third screen to finely adjust the position of each image of the image group.

First Determination Processing Section

The first determination processing section 36 executes first determination processing of determining the number of non-display images which have not been displayed on the third screen in the past.

More specifically, the first determination processing section 36 determines the number of first images P1 and the number of second images P2 on the basis of the number of non-display images acquired by the non-display image acquisition section 30 described above.

The first determination processing section 36 sets a first set value relating to the number of the non-display images.

In a case where the number of non-display images is less than the first set value, the first determination processing section 36 executes the above-mentioned second display processing using all non-display images as the first images P1. In such a case, the second image P2 is an image other than the non-display image, that is, an image, which has already been used in the main image display in the past, in the image group.

The "first set value" may be a predetermined set value or may be set by the user. In a case of the predetermined set value, for example, the set value may be set in a range capable of allowing for presentment to entertain the user and a range that does not miss the image of interest before switching of the screen.

Further, the "first set value" may be set in a case where the main image display is performed in accordance with the number of non-display images included in the image group, or may be set in accordance with the information processing capability of the user terminal 100.

On the other hand, in a case where the number of non-display images is equal to or greater than the first set value, the first determination processing section 36 sets non-display images, which have the same number as the first set value, as the first images P1, sets the remaining non-display images as the second images P2, and executes the second display processing. More specifically, non-display images having the same number as the first set value among latest non-display images including the last saved non-display image are set as the first images P1, and the remaining non-display images are set as the second images P2. Consequently, the second images P2 are images that have already been used in the past in the main image display and remaining non-display images other than the first image P1.

Second Determination Processing Section

The second determination processing section 37 executes second determination processing of determining the number of the first images P1 in the second display processing.

The second determination processing section 37 sets a second set value relating to the number of the first images P1.

In a case where the number of the first images P1 is smaller than the second set value, as shown in FIG. 7, the second determination processing section 37 moves the first image P1 into the first region R1 of the second screen 2E, in the second presentment.

It should be noted that the "first region R1" is set as a region that serves as a reference for defining a relationship with a second region R2 to be described later.

The "second set value" may be a predetermined set value, may be set by the user, may be set in a case where main image display is performed in accordance with the number of non-display images included in the image group, or may be set in accordance with the information processing capability of the user terminal 100.

Figure 8:
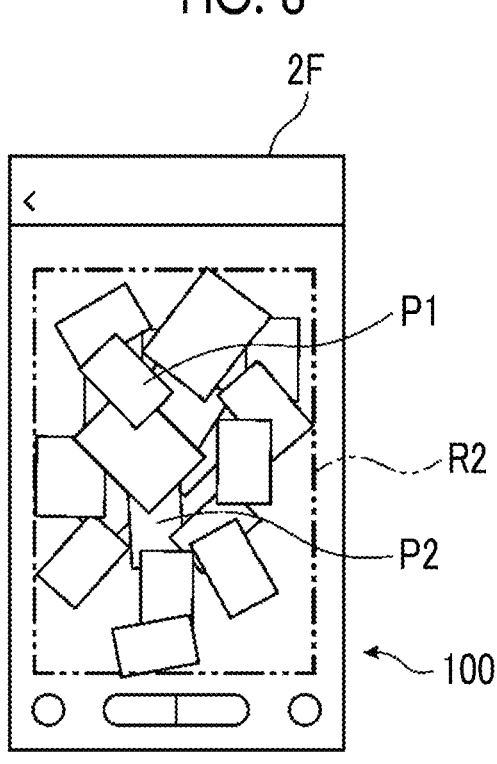
FIG. 8 is a diagram showing an example of the second screen.

On the other hand, in a case where the number of the first images P1 is equal to or greater than the second set value, as shown in FIG. 8, the second determination processing section 37 moves the first image P1 into the second region R2 which is larger than the first region R1 on the second screen 2F, in the second presentment.

Third Determination Processing Section

The third determination processing section 38 executes third determination processing of determining the number of images in the image group to be displayed on the second screen in the third presentment.

The third determination processing section 38 sets a third set value relating to the number of images in the image group.

Figure 9:
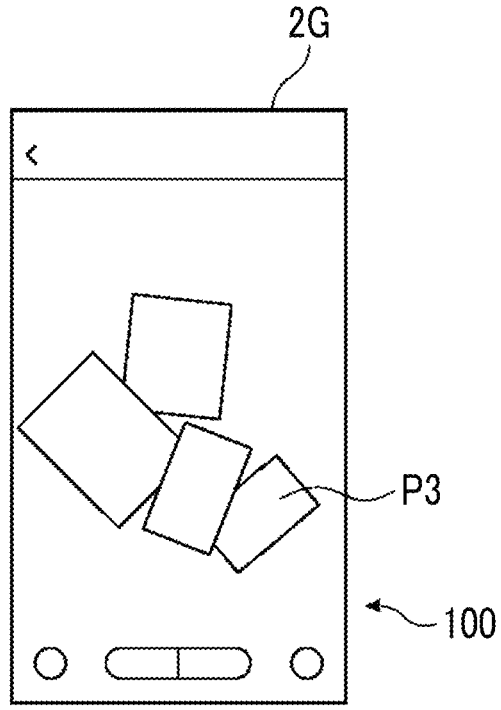
FIG. 9 is a diagram showing an example of the second screen.

In a case where the number of images is less than the third set value, as in the second screen 2G shown in FIG. 9, the third determination processing section 38 displays the display size of each image P3 of the image group in the third presentment as the first size.

It should be noted that the "first size" is set as a size that is a reference for defining a relationship with a second size to be described later.

Figure 10:
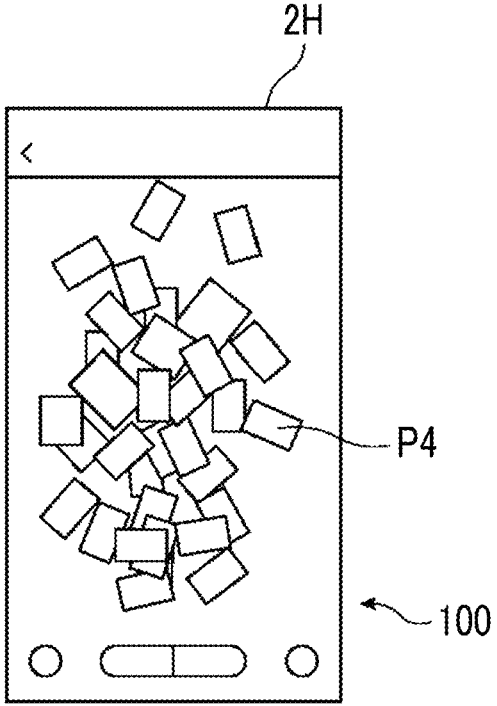
FIG. 10 is a diagram showing an example of the second screen.

On the other hand, in a case where the number of images is equal to or greater than the third set value, as in the second screen 2H shown in FIG. 10, the third determination processing section 38 performs display such that the display size of each image P4 of the image group in the third presentment is the second size which is larger than the first size.

Regarding Image Display Flow According to One Embodiment of Present Invention Next, a main image display flow, which is a data processing flow using the above-mentioned image display device 10, will be described. The main image display flow adopts the image display method according to the embodiment of the present invention and proceeds in accordance with the flow shown in FIG. 11. That is, each step in the flow shown in FIG. 11 corresponds to each element constituting the image display method according to the embodiment of the present invention.

It should be noted that the flow shown in FIG. 11 is merely an example, and an unnecessary step may be removed or a new step may be added within a scope not departing from the gist of the present invention.

The main image display flow is started by using activation of the image display application installed in the user terminal 100 as a trigger.

First, the processor 21 acquires a non-display image from the image group which is saved in the user terminal 100 or the database server 11 (S001). It should be noted that the processor 21 may acquire the non-display image by performing imaging, as in the example shown in FIG. 3.

Next, the processor 21 executes the first determination processing of determining the number of the non-display images (S002). In a case where the number of non-display images is smaller than the first set value, the processor 21 sets all the non-display images as the first images P1 and executes second display processing in the subsequent step. On the other hand, in a case where the number of non-display images is equal to or greater than the first set value, the processor 21 sets non-display images, which have the same number as the first set value, as the first images P1, sets the remaining non-display images as the second images P2, and executes the second display processing in the subsequent step. More specifically, the processor 21 sets non-display images, which have the same number as the first set value among latest non-display images including the last saved non-display image, as the first images P1, and sets the remaining non-display images as the second images P2.

Next, the processor 21 executes acquisition processing of acquiring the first image P1 (S003). Specifically, in a case of acquiring one first image P1, the processor 21 acquires the last saved image among the non-display images. On the other hand, in a case of acquiring a plurality of first images P1, the processor 21 acquires the non-display images, which have the number equal to or less than the first set value, among the latest non-display images including the last saved non-display image.

Next, the processor 21 executes the first display processing of displaying the first screen after the acquisition processing of the first image P1 (S004). The "first screen" may be a screen on which one or a plurality of first images P1 are placed, as in the first screens 1A and 1B shown in FIG. 1 and FIG. 2, or may be a screen in which the first image P1 is temporarily displayed during imaging but the first image P1 is not displayed after imaging, as in the first screen 1C shown in FIG. 3.

Next, the processor 21 receives an instruction for switching to the second screen (S005). In a case of receiving an instruction for switching to the second screen, the processor 21 performs necessary preprocessing (S006 and S007) prior to the switching to the second screen.

The processor 21 executes the second determination processing of determining the number of the first images P1 in the second display processing (S006). Specifically, in a case where the number of the first images P1 is less than the second set value, the processor 21 moves the first image P1 into the first region R1 of the second screen 2E in the second presentment in the subsequent step. (refer to FIG. 7). On the other hand, in a case where the number of the first images P1 is equal to or greater than the second set value, the processor 21 moves the first image P1 into the second region R2 which is larger than the first region R1 on the second screen in the second presentment in the subsequent step (refer to FIG. 8).

Further, the processor 21 executes the third determination processing of determining the number of images in the image group displayed on the second screen in the third presentment (S007). Specifically, as shown in FIG. 9, in a case where the number of images is less than the third set value, the processor 21 displays the display size of each image P3 of the image group in the third presentment in the subsequent step as the first size. On the other hand, as shown in FIG. 10, in a case where the number of images is equal to or greater than the third set value, the processor 21 performs display such that the display size of each image P4 of the image group in the third presentment in the subsequent step is the second size which is larger than the first size.

In a case where the necessary preprocessing (S006 and S007) ends, the processor 21 executes the second display processing of switching the first screen after the first display processing to display the second screen for presentment (S008). The processor 21 performs each of the first presentment, the second presentment, and the third presentment as the second display processing.

First, the processor 21 executes the first presentment in which the second image P2 other than the first image P1 in the image group is placed on the second screen (S009). In the first presentment, the processor 21 displays the display layer of the first image P1 above the display layer of the second image P2.

After the first presentment, the processor 21 executes the second presentment in which the first image P1 is moved into the placement region on the second screen while reducing the display size of the first image P1 (S010). Next, after the second presentment, the processor 21 executes the third presentment in which the first image P1 is placed in the placement region (S011). Then, after the second display processing, the third screen, in which the image group including the first image P1 and the second image P2 is randomly placed, is displayed (S012).

The main image display flow ends immediately at a time point at which the series of processing hitherto described end. Further, the main image display flow is repeatedly executed whenever the main image display is performed.

Regarding Efficacy of One Embodiment of Present Invention

According to the image display device 10, it is possible to detect a placement position of the newly acquired first image P1 in a case of transition of the display screen. Specifically, the user is able to detect the placement position of the first image P1 by performing the presentment (particularly, the second presentment) in which the first image P1 of interest is moved before the screen is switched.

Further, according to the image display device 10, in a case of switching the screen, the presentment of the animation which is performed as if the first image P1 is dropped in the depth direction of the screen in the real space, is performed by the first to third presentments. Therefore, the user is able to enjoy the presentment in a case of switching the screens.

More specifically, in the first presentment, by displaying the first image P1 at the upper position of the second image P2 randomly placed, it is possible to provide, to the user, a sense of anticipation as to what kind of presentment is to be performed from now.

Then, in the second presentment, the user is able to enjoy the behavior of the first image P1 by viewing the presentment in which the first image P1 is reduced while being moved relative to the second image P2 randomly placed.

Furthermore, in the third presentment, by placing the first image P1 relative to the randomly placed second image P2, the user is able to enjoy a sense of unity of the image group including the first image P1 and the second image P2.

Further, the processor 21 displays the first image P1 (third image), which is displayed on the first screen at the end of the first display processing, on the second screen.

Thereby, it is possible to perform presentment as if the display of the first image P1 is continued before and after the switching of the screen, and it is possible to easily detect the placement position of the first image P1 of interest before the switching of the screen.

Further, the processor 21 displays the first image P1 on the second screen by using one or both of the display position and the display form of the first image P1 (third image) displayed on the first screen.

Thereby, it is possible to more effectively perform presentment as if the display of the first image P1 is continued throughout the screens, and it is possible to further easily detect the placement position of the first image P1 of interest before the switching of the screen.

Further, the third image is an image displayed at the end of the first display processing, and is an image including the first image P1.

Thereby, it is possible to perform presentment as if the image to be displayed at the end of the first display processing is continued before and after the switching of the screen, and it is possible to easily detect the placement position of the image of interest before the switching of the screen.

Further, the processor 21 acquires a photographic image, which is obtained by capturing a photograph as the first image P1, in the acquisition processing.

Thereby, since the first to third presentments can be performed using the photographic image as the first image P1, the user is able to further enjoy the presentments.

Further, the processor 21 displays the entire first image P1 in the second screen during the period of the second presentment.

Thereby, it is possible to more effectively reduce a probability that the image of interest is missed.

Further, the first image P1 used in the second display processing is a non-display image which has not been displayed on the third screen in the past.

Thereby, it is possible to appropriately detect the placement position of the non-display image.

The processor 21 further executes the first determination processing of determining the number of non-display images which have not been displayed on the third screen in the past. Further, the processor 21 sets the first set value relating to the number of the non-display images. The second display processing may be executed in a state where all the non-display images are set as the first images P1 in a case where the number of the non-display images is less than the first set value. The second display processing is executed in a state where non-display images having the same number as the first set value are set as the first images P1 and remaining non-display images are set as the second images P2 in a case where the number of the non-display images is equal to or greater than the first set value.

Thereby, since the number of first images P1 for executing the second display processing is set, it is possible to reduce a load of calculation processing of the image display device 10. Moreover, the presentment time can be set to an appropriate time in accordance with the number of the non-display images.

Further, in the third display processing, the processor 21 performs display such that the display layer of the second image P2 is positioned above the display layer of the second image P2.

Thereby, images having newer acquisition dates and times in the image group are displayed on higher display layers on the third screen. Therefore, it is possible to easily detect the acquisition order of the images.

Further, in the second presentment, the processor 21 moves the plurality of first images P1 into the placement region on the second screen. Therefore, the user is able to further enjoy the presentment, as compared with the case of one first image P1.

Further, in the second presentment, among the plurality of first images P1, the processor 21 moves the first image P1 into the placement region earlier as the first image P1 is positioned at a lower position, and moves the first image P1 into the placement region later as the first image P1 is positioned at a higher position.

Thereby, it is possible to appropriately detect a placement position of the first image P1, which has the new acquisition date and time, among the plurality of first images P1.

Further, the processor 21 executes the second determination processing of determining the number of the first images P1 in the second display processing. Further, the processor 21 sets the second set value relating to the number of the first images P1. As shown in FIG. 7, in a case where the number of the first images P1 is less than the second set value, the first image P1 is moved into the first region R1 on the second screen in the second presentment. On the other hand, as shown in FIG. 8, in a case where the number of the first images P1 is equal to or greater than the second set value, in the second presentment, the first image P1 is moved into the second region R2 which is larger than the first region R1 on the second screen.

Thereby, the first image P1 can be appropriately placed in the second screen in accordance with the number of the first images P1.

In the third display processing, as shown in FIG. 6, the processor 21 displays the image group such that the density of the image group is higher as the image group is closer to the center C of the third screen 3D.

Thereby, it is possible to perform presentment for a sense of unity to the image group while randomly placing the image group.

Further, the processor executes the third determination processing of determining the number of images of an image group displayed on the second screen in the third present- ment. Further, the processor 21 sets the third set value relating to the number of images. A display size of each image of the image group in the third presentment may be displayed in a first size in a case where the number of images is less than the third set value. On the other hand, a display size of each image of the image group in the third present- ment is displayed in a second size larger than the first size in a case where the number of images is equal to or greater than the third set value.

Thereby, it is possible to keep a sense of unity in a case of randomly placing the image group while detecting the display content of each image.

Further, the processor 21 changes a placement position of at least one of the first image P1 or the second image P2 which is close to each other, in the third presentment.

Thereby, presentment is performed as if the dropped first image P1 is brought into contact with the second image P2 in a real space and at least one placement position is moved in the direction along the placement region. Therefore, it is possible to effectively perform presentment which entertains the user.

Further, the processor 21 changes the display shape of the first image P1 during the movement of the first image P1, in the second presentment.

Thereby, presentment, in which the first image P1 is dropped relatively slowly while being shaken along the vertical direction or the horizontal direction of the second screen, is executed. Therefore, it is possible to effectively perform presentment which entertains the user.

Regarding Other Embodiments

In the above-mentioned embodiment, the image display device 10 is configured by using a server computer, but the present invention is not limited thereto. For example, the image display device of one embodiment of the present invention may be configured by using a user terminal. In such a case, the user terminal is able to execute the series of processing without using the network N.

In the above-mentioned embodiment, the description has been made on the premise that the image is a still image, but the present invention is not limited thereto. Thus, the image may be a moving image in which the display content changes over time. Specifically, as shown in FIGS. 12 to 16, an image R may be a moving image that gradually changes in order from the left side of each drawing. The processor changes the image R by using a well-known image process- ing technique, specifically, an animation technique for changing the shades of the image.

Figure 12:
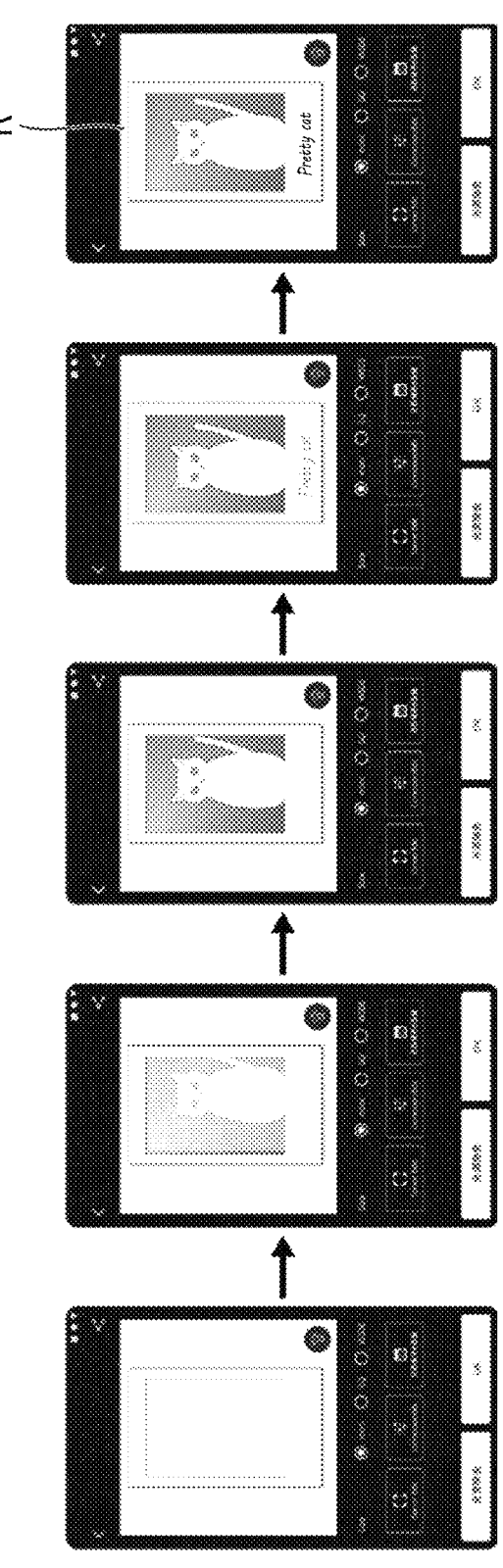
FIG. 12 is a diagram showing an example of transition of an image displayed on a screen of a user terminal.
Figure 13:
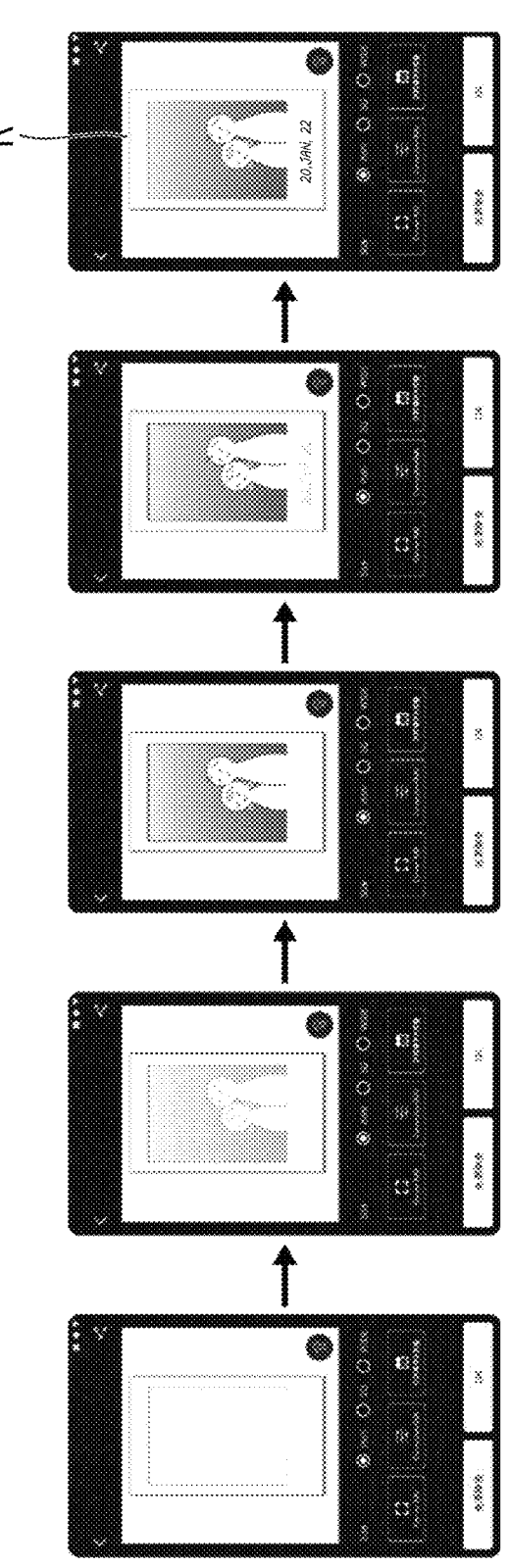
FIG. 13 is a diagram showing an example of transition of an image displayed on the screen of the user terminal.

The image R shown in FIGS. 12 and 13 will be described in more detail.

In the image R (which is first from the left side in FIGS. 12 and 13) which is displayed first, a boundary line smaller than the peripheral edge of the image R by one size is displayed in the image R. An image area in which a subject is not yet captured is displayed in a region closer to the inner side than the boundary line, and a solid frame portion is displayed in a region closer to the outer side than the boundary line.

In the image R (which is second from the left side in FIGS. 12 and 13) which is displayed next, an image area, in which the subject is placed, is displayed in the region closer to the inner side than the boundary line. As in the image R displayed previously, the solid frame portion is displayed in the region closer to the outer side than the boundary line.

In the next displayed image R (which is third from the left side in FIGS. 12 and 13), an image area, in which the subject having a higher density (lower transmittance) than the previous image area is placed, is displayed in a region closer to the inner side than the boundary line. As in the previous image, the solid frame portion is displayed in the region closer to the outer side than the boundary line.

In the next displayed image R (which is fourth from the left side in FIGS. 12 and 13), an image area, which is the same as the previous image area and in which the subject is placed, is displayed in the region closer to the inner side than the boundary line. On the other hand, the frame portion, in which a pattern (specifically, "handwritten text") is placed, is displayed in the region closer to the outer side than the boundary line.

In the next displayed image (which is fifth from the left side in FIGS. 12 and 13), an image area, which is the same as the previous image area and in which the subject is placed, is displayed in the region closer to the inner side than the boundary line. On the other hand, the frame portion, in which a pattern having a higher density (lower transmit- tance) than the previous frame portion is placed, is displayed in the region closer to the outer side than the boundary line.

As described above, the processor executes the present- ment in which the display content in the image R changes over time. Therefore, development of the photographic image obtained by the instant camera, that is, generation of the printed matter on which the photographic image is printed, can be reproduced in an animation image. Thereby, the user is able to obtain an experience as if the actual imaging is performed with the instant camera. Further, the display of the pattern of the frame portion, which is origi- nally handwritten, also changes over time. Therefore, it is possible to create a sense of unity as the whole.

Figure 14:
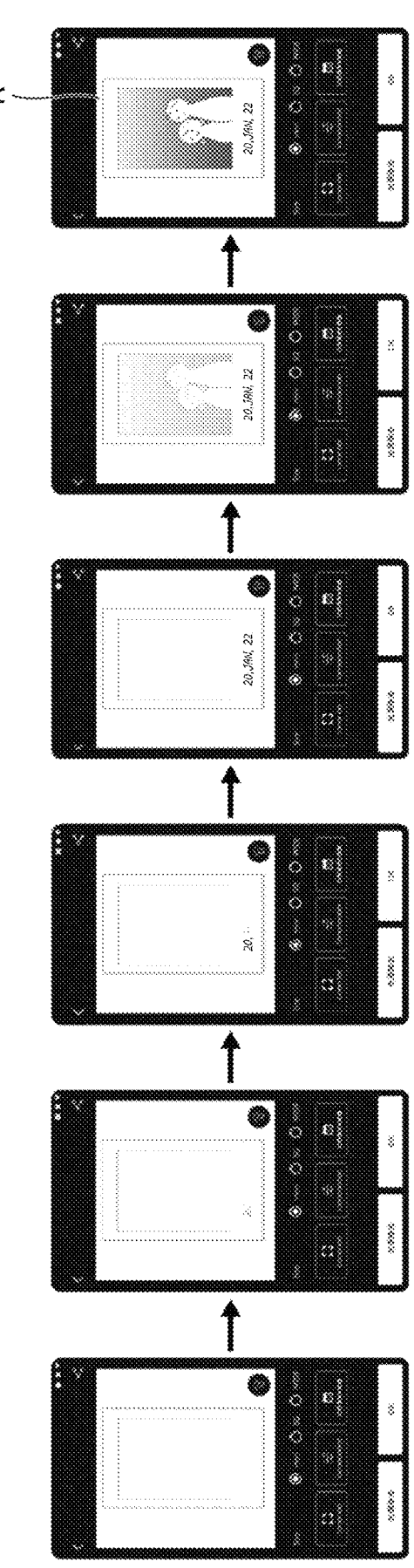
FIG. 14 is a diagram showing an example of transition of an image displayed on the screen of the user terminal.
Figure 15:
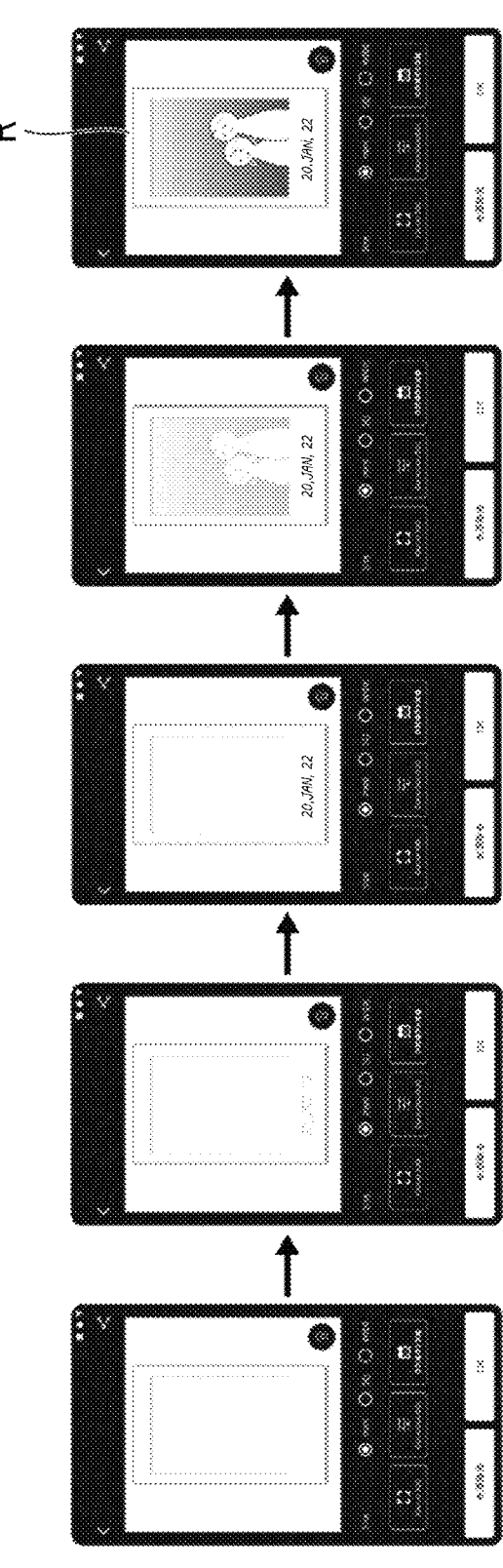
FIG. 15 is a diagram showing an example of transition of an image displayed on the screen of the user terminal.
Figure 16:
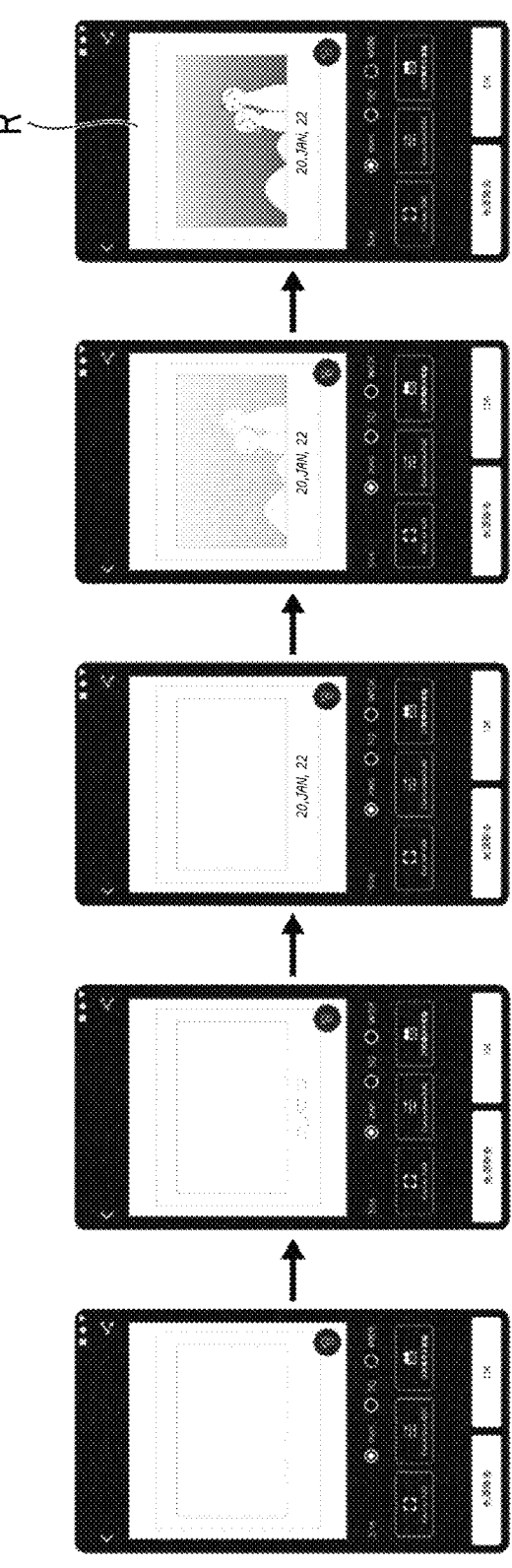
FIG. 16 is a diagram showing an example of transition of an image displayed on the screen of the user terminal.

It should be noted that in the above-mentioned example, the frame portion is changed after the image area is changed. However, the embodiment of the present invention is not limited thereto, and as shown in FIGS. 14 to 16, the image area may be changed after the frame portion is changed. For example, it is possible to appropriately set which of the image area and the frame portion is changed first, on the basis of an input from the user.

Figure 17:
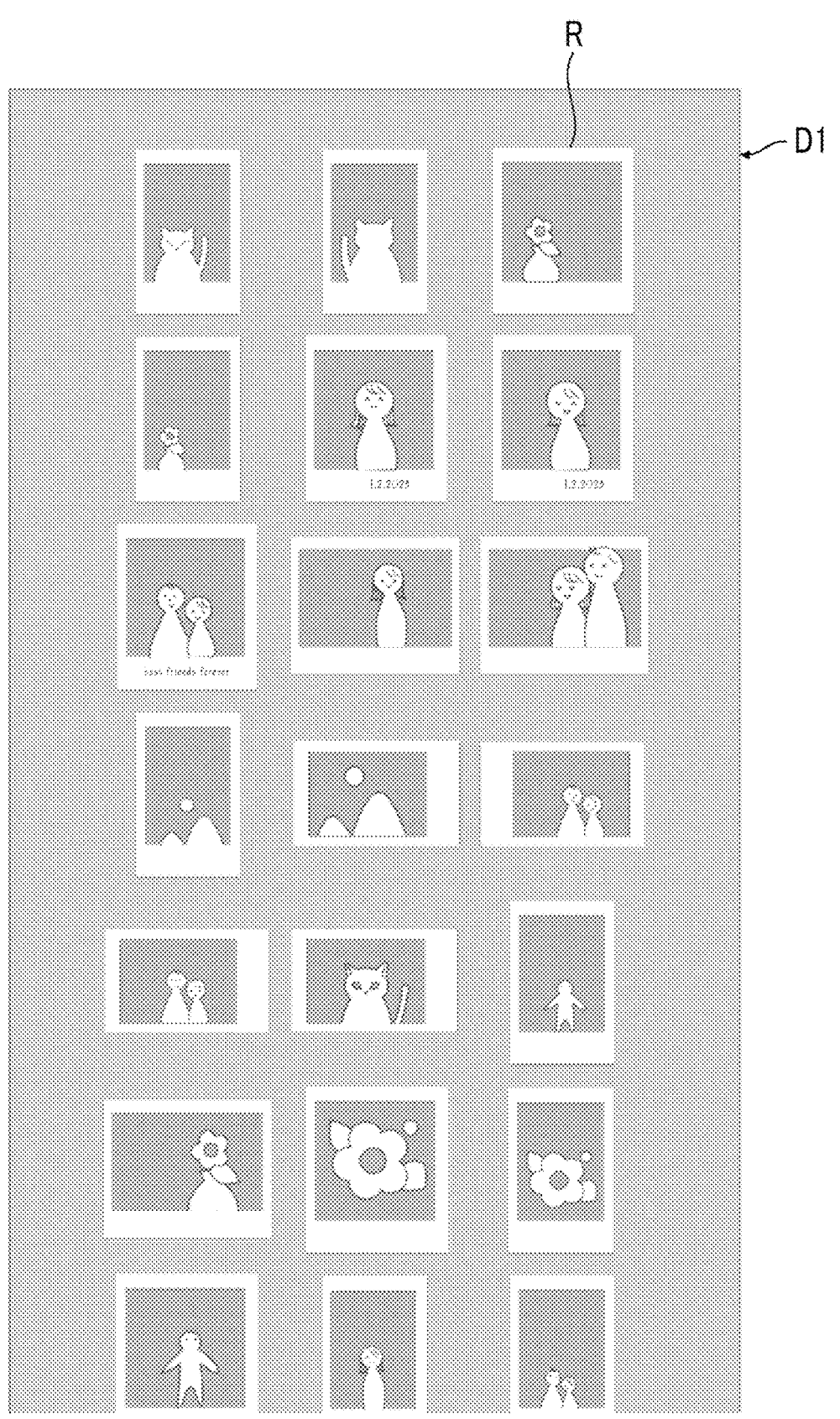
FIG. 17 is a diagram showing an example of the screen of the user terminal.
Figure 18:
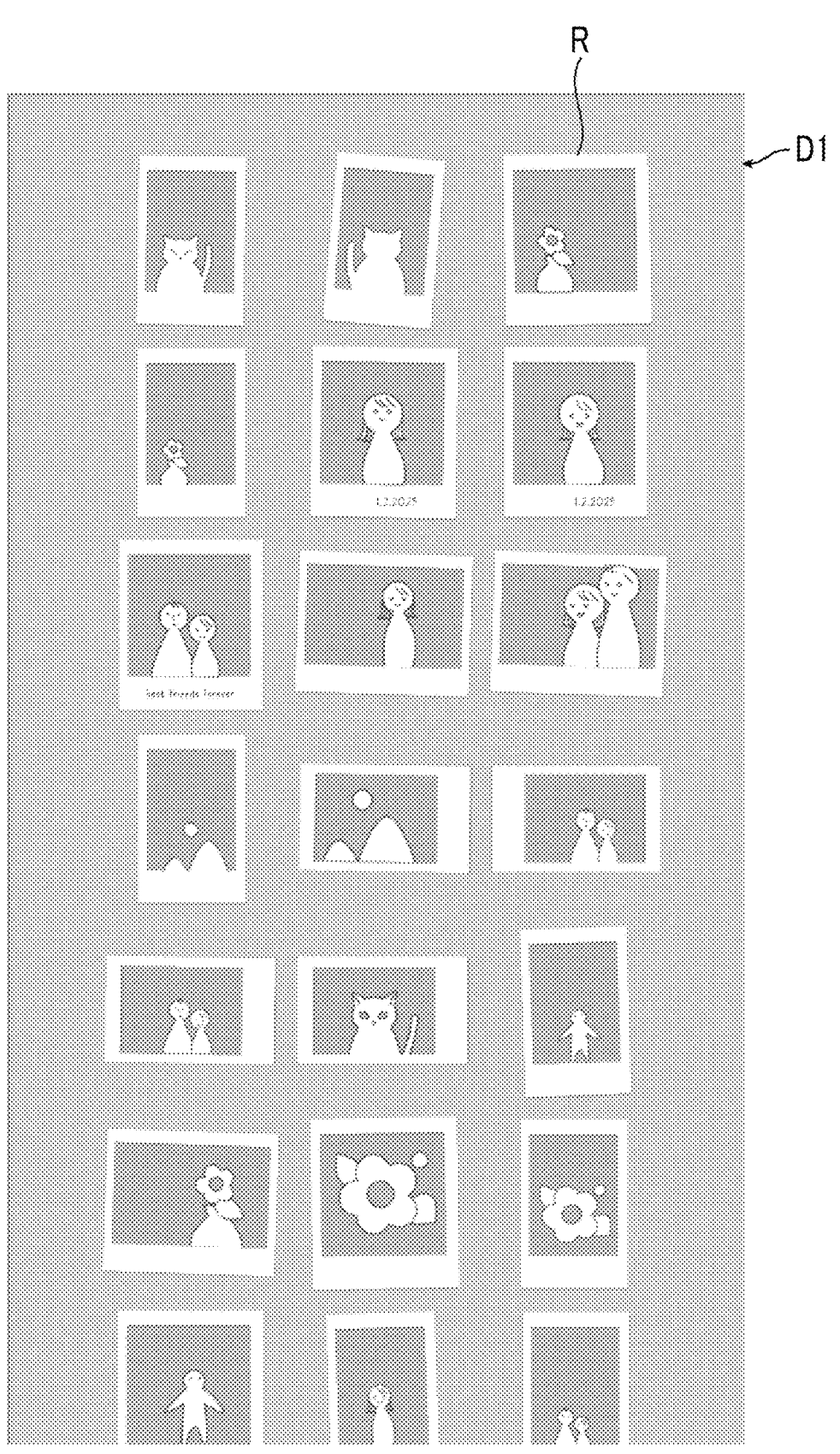
FIG. 18 is a diagram showing an example of the screen of the user terminal.

Further, the image display device may regularly display an image group in a display screen D1 of the user terminal 100, as shown in FIGS. 17 and 18. The term "regularly" means that a placement position of each of the plurality of images R is determined on the basis of a certain rule. For example, as shown in FIGS. 17 and 18, the term "regularly" corresponds to a case where the plurality of images R are placed in a matrix shape (lattice shape) or a case where the plurality of images R are placed on the basis of certain rules such as a circular shape, a rectangular shape, and a column shape.

The processor provided in the image display device according to the embodiment of the present invention includes various processors. Examples of the various processors include a CPU, which is a general-purpose processor that executes software (program) and functions as various processing sections.

Moreover, various processors include a programmable logic device (PLD), which is a processor of which a circuit configuration can be changed after manufacturing, such as a field programmable gate array (FPGA).

Moreover, the various processors described above also include a dedicated electric circuit, which is a processor having a circuit configuration specially designed for executing a specific processing, such as an application specific integrated circuit (ASIC).

Moreover, one processing section provided in the image display device according to the embodiment of the present invention may be configured by using one of the various processors described above, or may be configured by using a combination of two or more processors of the same type or different types, for example, a combination of a plurality of FPGAs or a combination of an FPGA and a CPU.

Moreover, a plurality of functional sections provided in the image display device according to the embodiment of the present invention may be configured by using one of various processors, or may be configured by using one processor in which two or more of the plurality of functional sections are combined.

Moreover, as in the embodiment described above, a form may be adopted in which one processor is configured by using a combination of one or more CPUs and software, and the processor functions as the plurality of functional sections.

Moreover, for example, as represented by a system on chip (SoC) or the like, a form may be adopted in which a processor is used in which the functions of the whole system which includes the plurality of functional sections in the image display device according to the embodiment of the present invention are realized by a single integrated circuit (IC) chip. Moreover, a hardware configuration of the various processors described above may be an electric circuit (circuitry) in which circuit elements, such as semiconductor elements, are combined.

Explanation of References 1A, 1B, 1C: first screen
2A, 2B, 2C, 2E, 2F, 2G, 2H: second screen
3A, 3B, 3D: third screen
10: image display device
11: database server
21: processor
22: memory
23: communication interface
24: storage device
30: non-display image acquisition section
31: first image acquisition section
32: first display processing section
33: display switch receiving section
34: second display processing section
35: third display processing section
36: first determination processing section
37: second determination processing section
38: third determination processing section
C: center
D1: display screen
N: network
P1: first image
P2: second image
P3, P4: image R: image
R1: first region
R2: second region
S: image display system
Y, Z: icon

What is claimed is:

1. An image display device comprising:
a processor,
wherein the processor is configured to execute:
   acquisition processing of acquiring a first image;
   first display processing of displaying a first screen;
   second display processing of displaying a second screen; and
   third display processing of displaying a third screen in which an image group including the first image is placed,
the second display processing is executed between the first display processing and the third display processing, and
the second display processing includes
   first presentment, in which a second image different from the first image in the image group is placed, on the second screen,
   second presentment, in which the first image is moved within the second screen while a display form of the first image is changed, after the first presentment, and
   third presentment, in which the first image is placed in a predetermined region, after the second presentment, and
wherein the processor is configured to further execute first determination processing of determining the number of non-display images which have not been displayed on the third screen in the past,
a first set value relating to the number of the non-display images is set,
a first non-display image of the non-display images determined according to the first set value and the number of the non-display images is determined as the first image, and
a second non-display image of the non-display images other than the first non-display image determined as the first image is determined as the second image.

2. The image display device according to claim 1, wherein the processor is configured to display a third image, which is displayed on the first screen at an end of the first display processing, on the second screen.

3. The image display device according to claim 2, wherein the processor is configured to display the third image, which is displayed on the first screen, on the second screen in one or both of a display position and a display form of the third image.

4. The image display device according to claim 2, wherein the third image is an image which is displayed at the end of the first display processing.

5. The image display device according to claim 4, wherein the third image is an image which includes the first image.

6. The image display device according to claim 1, wherein the processor is configured to acquire a photographic image, which is obtained by capturing a photograph as the first image, in the acquisition processing.

7. The image display device according to claim 1, wherein the processor is configured to display the entire first image in the second screen during a period of the second presentment.

8. The image display device according to claim 1, wherein the first image, which is used in the second display processing, is a non-display image which has not been displayed on the third screen in the past.

9. The image display device according to claim 1, wherein the second display processing is executed in a state where all the non-display images are set as the first image in a case where the number of the non-display images is less than the first set value, and the second display processing is executed in a state where the non-display images having the same number as the first set value are set as the first image and remaining non-display images are set as the second image in a case where the number of the non-display images is equal to or greater than the first set value.

10. The image display device according to claim 1, wherein the processor is configured to perform display such that a display layer of the first image is positioned above a display layer of the second image in the third display processing.

11. The image display device according to claim 1, wherein the processor is configured to further execute second determination processing of determining the number of the first image in the second display processing, a second set value relating to the number of the first image is set, the first image is moved into a first region of the second screen in the second presentment in a case where the number of the first image is less than the second set value, and the first image is moved into a second region larger than the first region of the second screen in the second presentment in a case where the number of the first image is equal to or greater than the second set value.

12. The image display device according to claim 1, wherein the processor is configured to perform display such that a density of the image group is larger as the image group is closer to a center of the third screen in the third display processing.

13. The image display device according to claim 1, wherein the processor is configured to further execute third determination processing of determining the number of images in the image group displayed on the second screen in the third presentment, a third set value relating to the number of images is set, a display size of each image of the image group in the third presentment is displayed in a first size in a case where the number of images is less than the third set value, and a display size of each image of the image group in the third presentment is displayed in a second size smaller than the first size in a case where the number of images is equal to or greater than the third set value.

14. The image display device according to claim 1, wherein the processor is configured to change a placement position of at least one of the first image or the second image which are close to each other, in the third presentment.

15. The image display device according to claim 1, wherein the processor is configured to change a display shape of the first image during the movement of the first image, in the second presentment.

16. An image display method of causing a processor to execute:

acquisition processing of acquiring a first image;

first display processing of displaying a first screen;

second display processing of displaying a second screen; and third display processing of displaying a third screen in which an image group including the first image is placed, wherein the second display processing is executed between the first display processing and the third display processing, and the second display processing includes first presentment, in which a second image different from the first image in the image group is placed, on the second screen, second presentment, in which the first image is moved within the second screen while a display form of the first image is changed, after the first presentment, and third presentment, in which the first image is placed in a predetermined region, after the second presentment, and wherein the image display method of causing the processor to further execute first determination processing of determining the number of non-display images which have not been displayed on the third screen in the past, a first set value relating to the number of the non-display images is set, a first non-display image of the non-display images determined according to the first set value and the number of the non-display images is determined as the first image, and a second non-display image of the non-display images other than the first non-display image determined as the first image is determined as the second image.

17. A non-transitory computer-readable storage medium storing:

a program that causes a computer to execute each processing included in the image display method according to claim 16.

* * * * *